L. F. DIETER.
CAR WHEEL OR SIMILAR BODY.
APPLICATION FILED NOV. 9, 1917.
1,377,617.
Patented May 10, 1921.
9 SHEETS—SHEET 7.
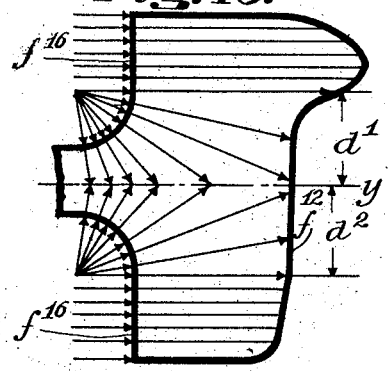
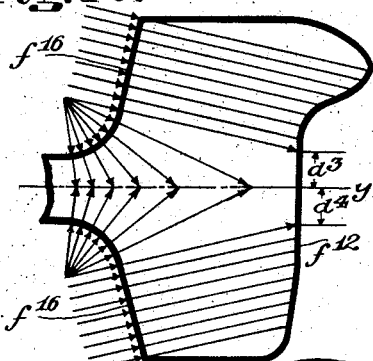
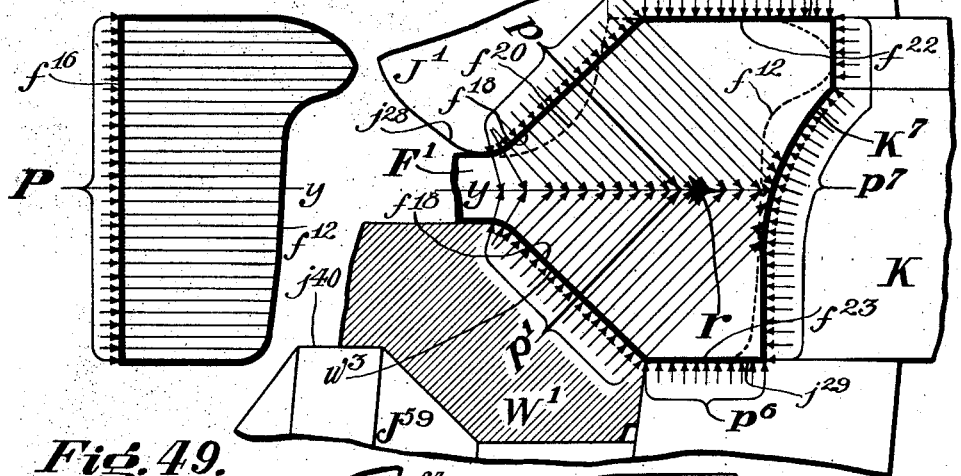
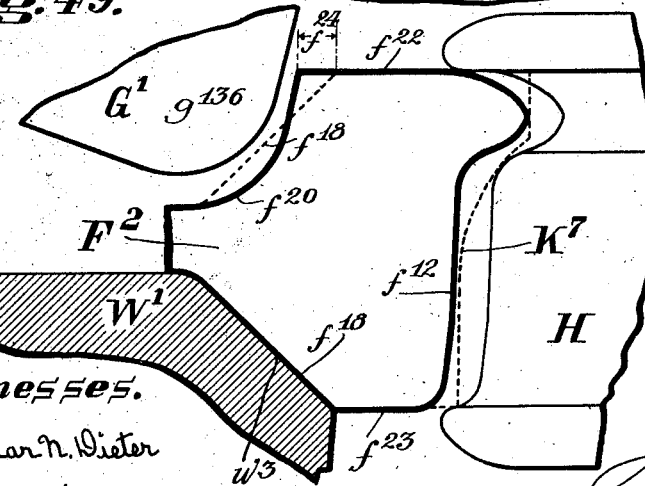
Witnesses.
Waldemar N. Dieter
Francis J. Houlihan
Inventor:
Louis F. Dieter

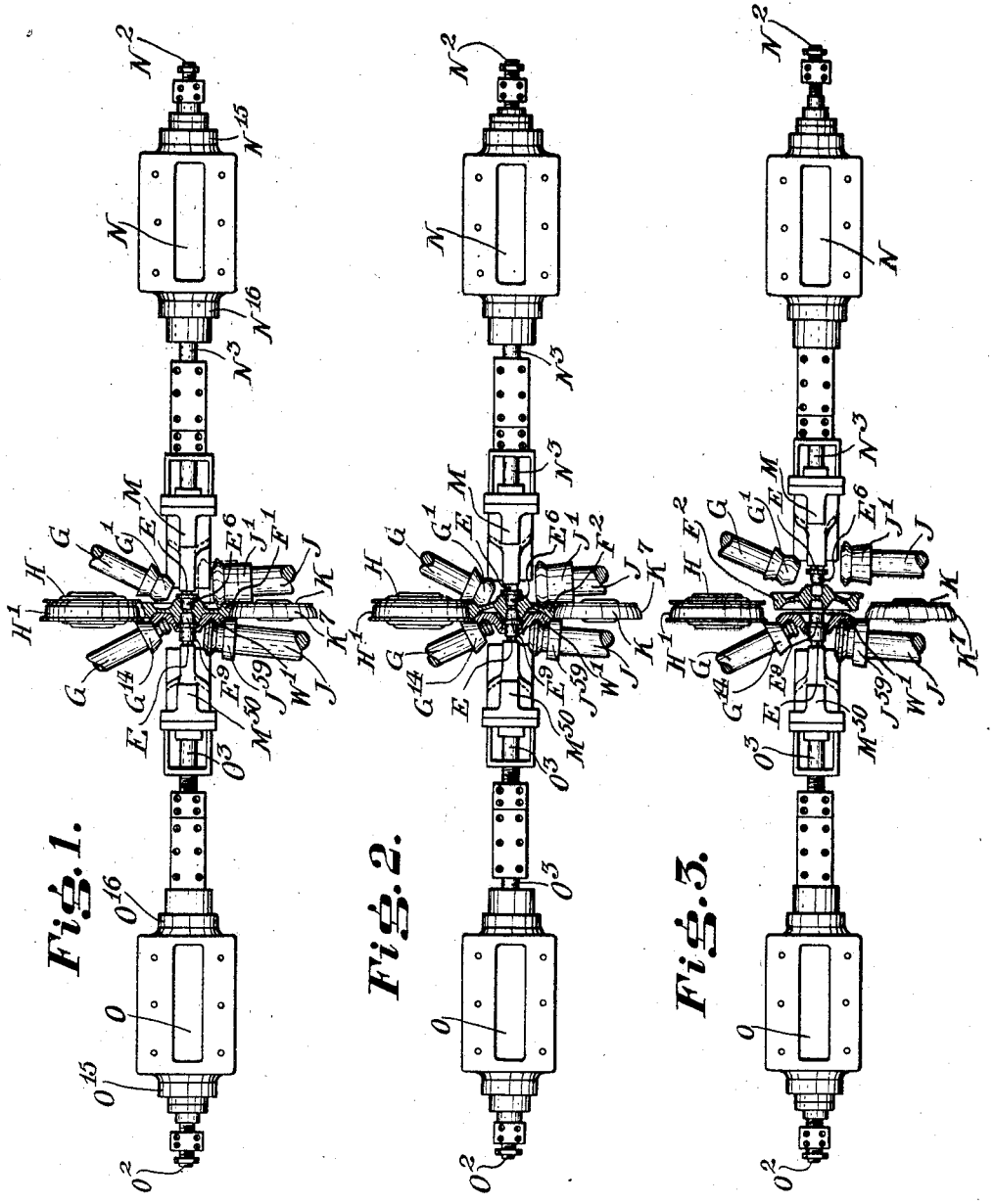

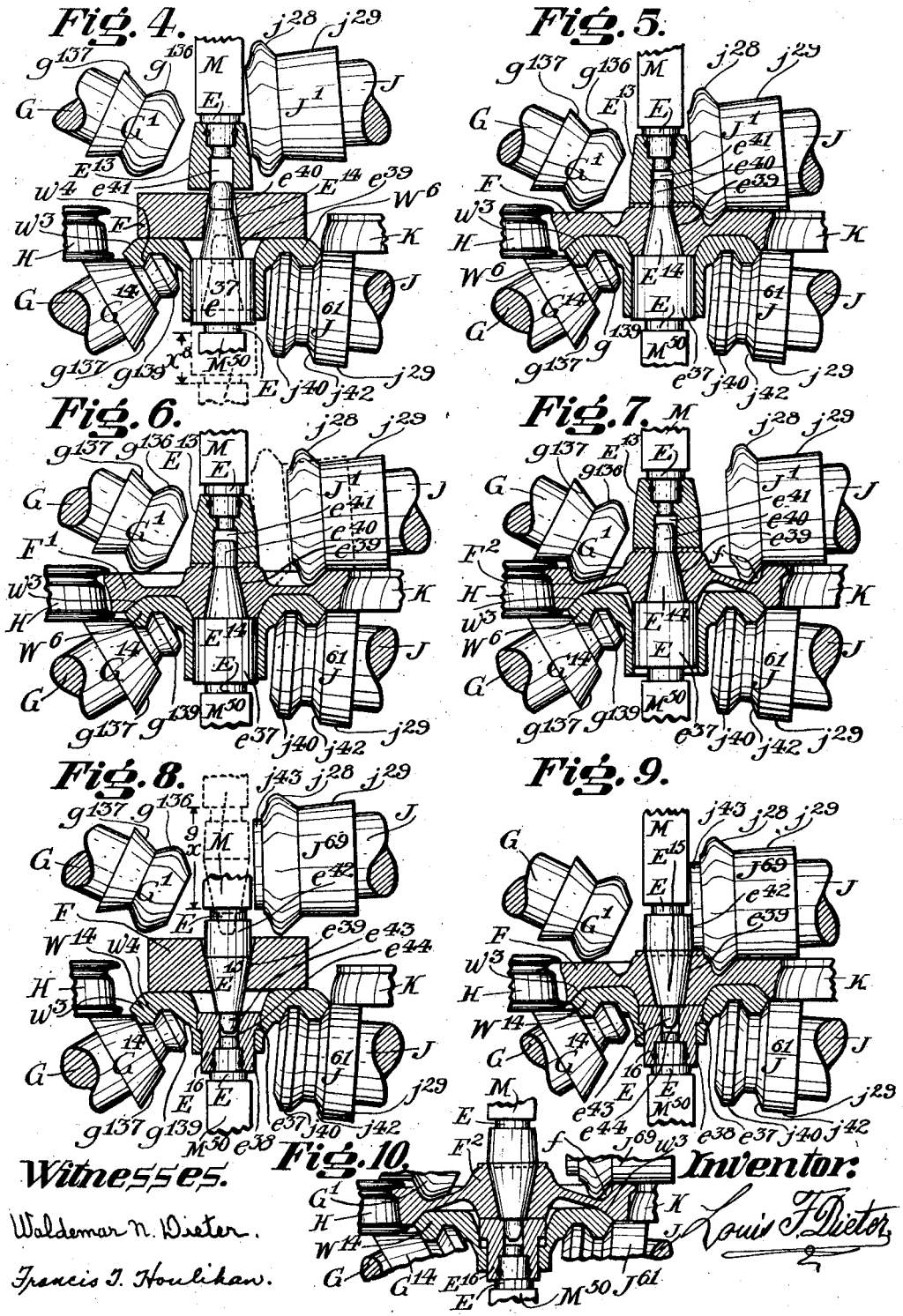

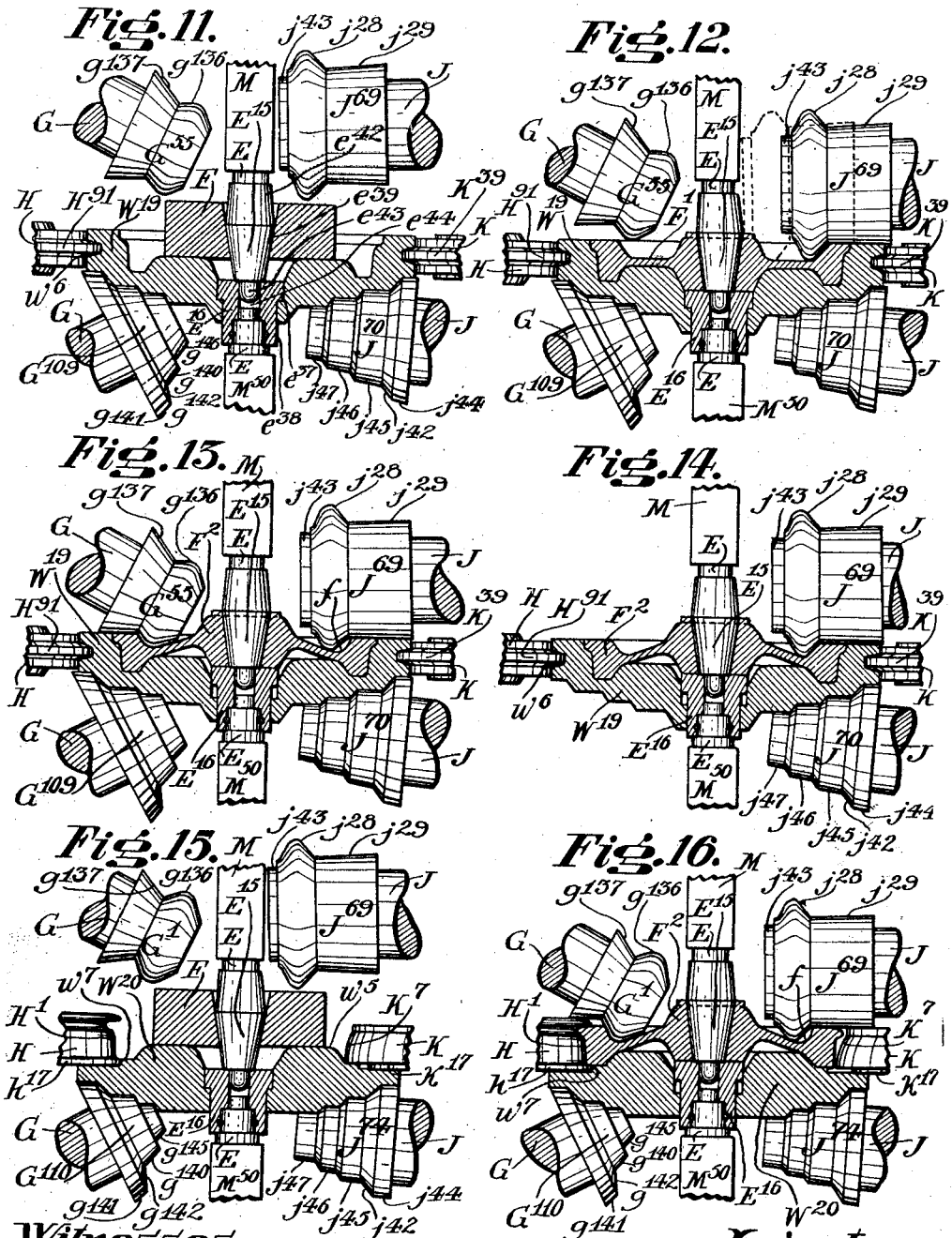

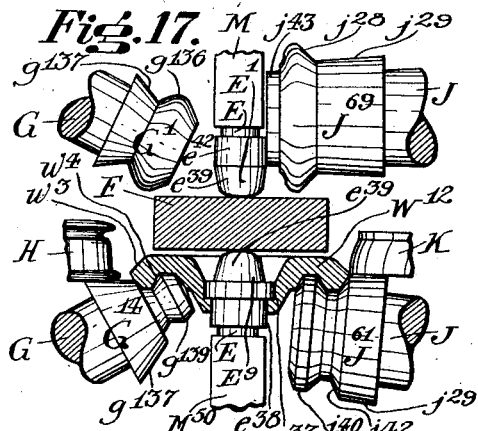
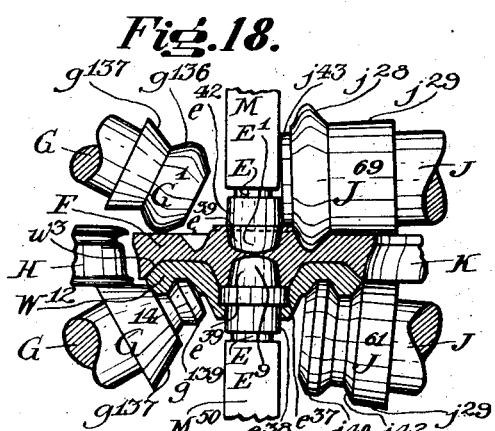
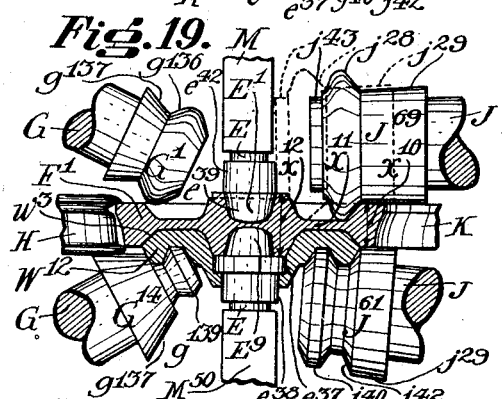
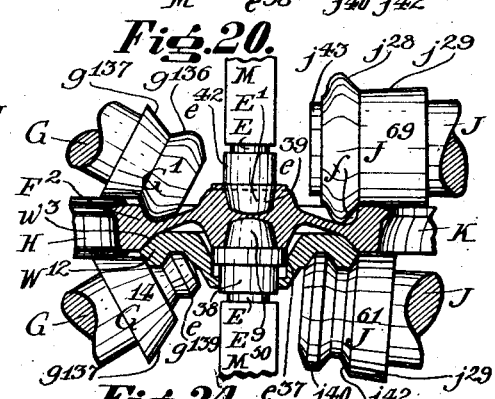
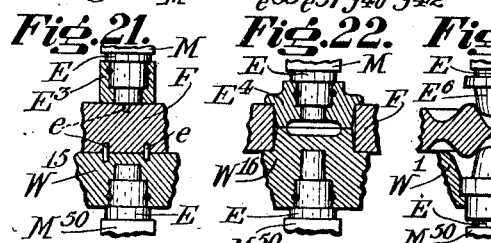
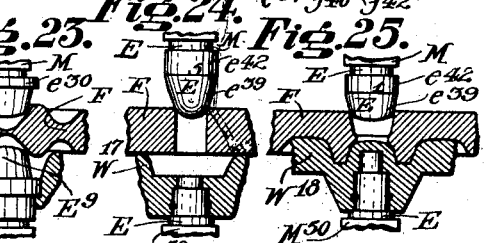

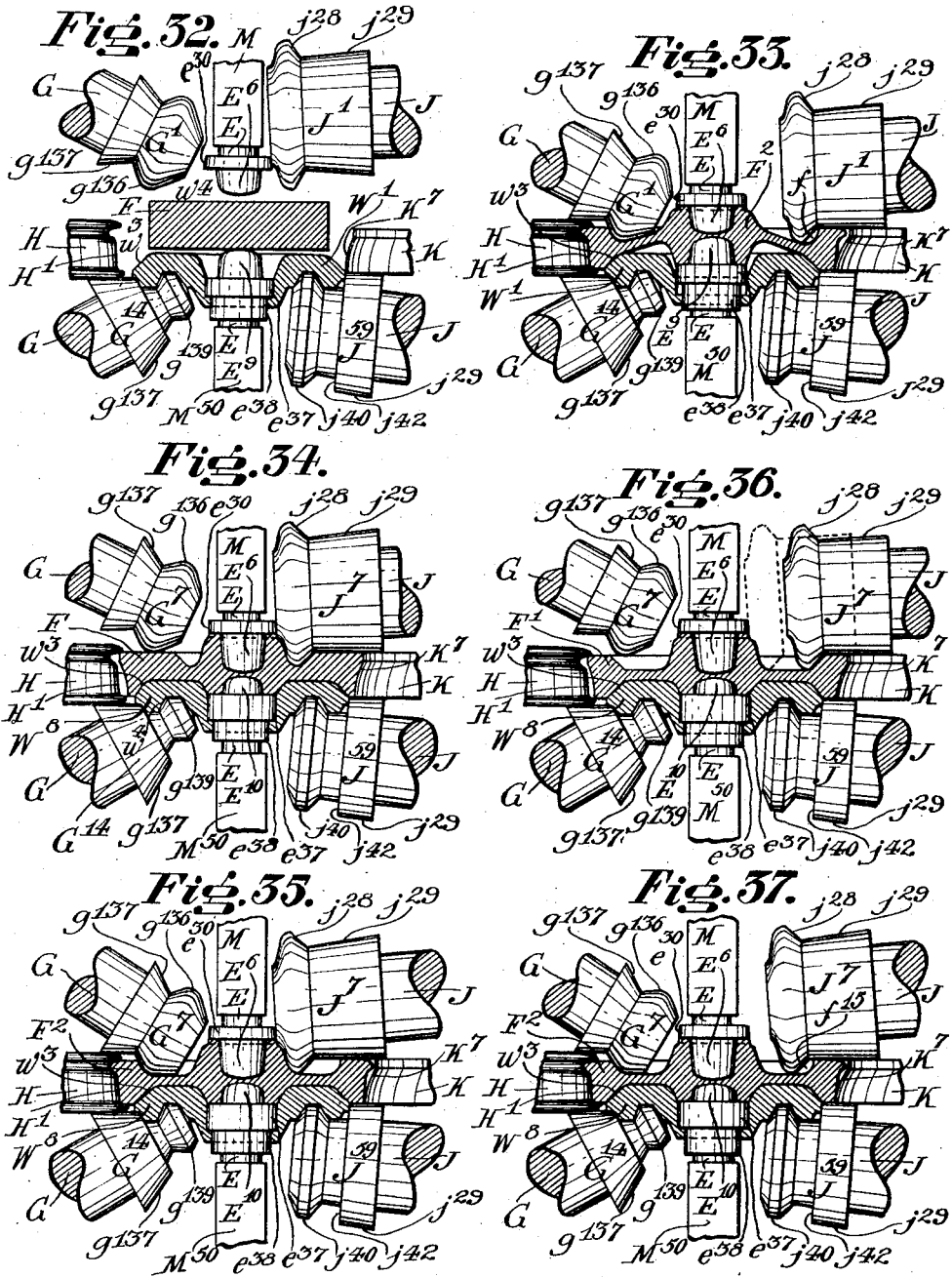

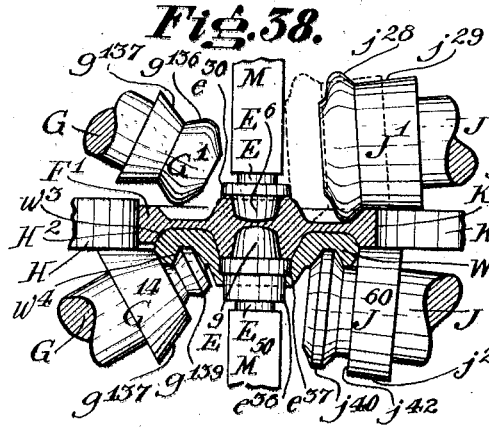
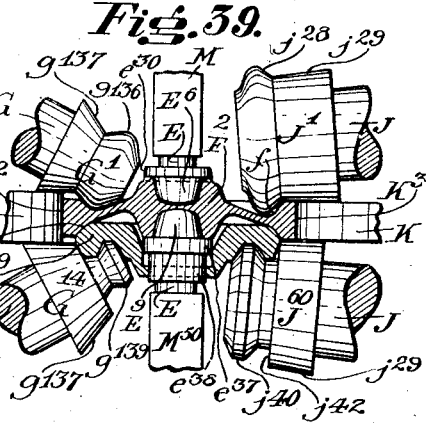
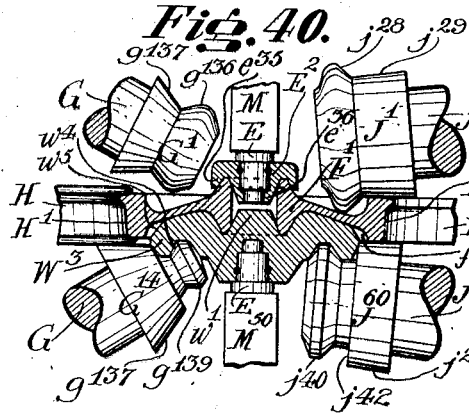
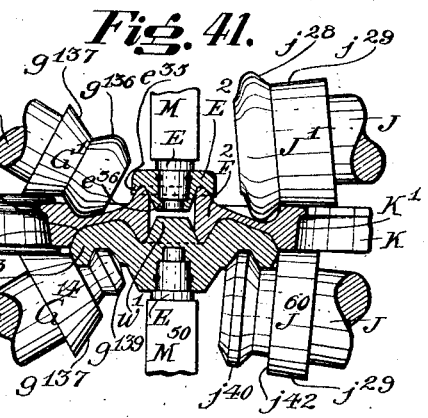
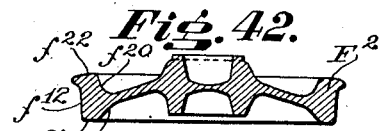
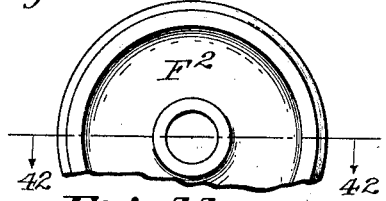
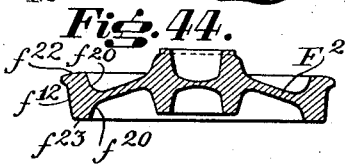

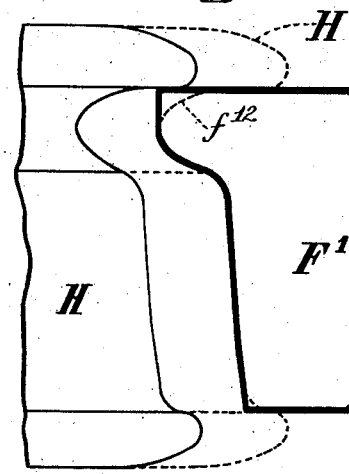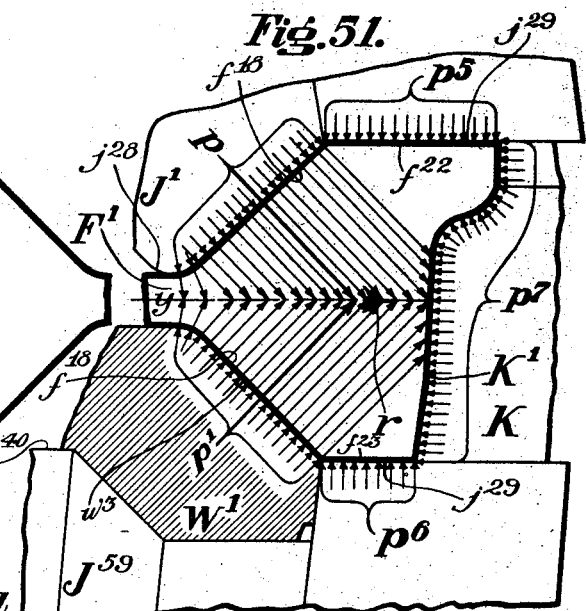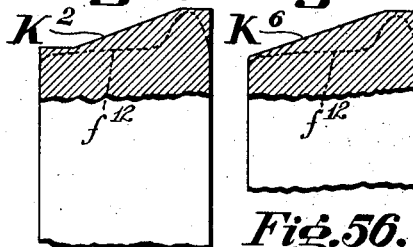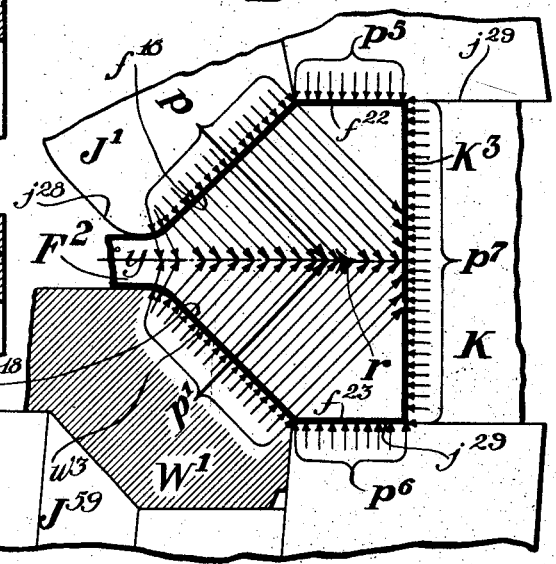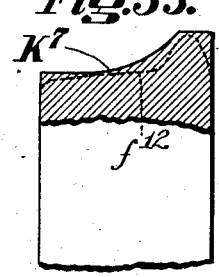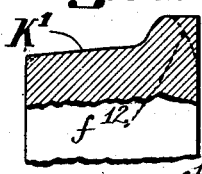

L. F. DIETER.
CAR WHEEL OR SIMILAR BODY.
APPLICATION FILED NOV. 9, 1917.

1,377,617.

Patented May 10, 1921.
9 SHEETS—SHEET 9.

Witnesses.
Waldemar N. Dieter.
Francis T. Houlihan.

Inventor.
Louis F. Dieter.

UNITED STATES PATENT OFFICE.

LOUIS F. DIETER, OF BUFFALO, NEW YORK.

CAR-WHEEL OR SIMILAR BODY.

1,377,617.          Specification of Letters Patent.      Patented May 10, 1921.

Continuation of application Serial No. 633,343, filed June 15, 1911, (Patent No. 1,243,050,) and a division of application Serial No. 195,637, filed October 9, 1917, (Patent No. 1,319,142.) This application filed November 9, 1917. Serial No. 201,036.

*To all whom it may concern:*

Be it known that I, LOUIS F. DIETER, a citizen of the United States, residing at Buffalo, in the county of Erie and State of New York, have invented new and useful Improvements in Car-Wheels or Similar Bodies, of which the following is a specification, accompanied by nine sheets of drawings.

The features of my invention claimed herein are related to the invention of my original application filed June 15, 1911, Serial No. 633,343, Patent No. 1,243,050, and of my application filed October 9, 1917, Serial No. 195,637, Patent No. 1,319,142. This application is a continuation of my said original application, Serial No. 633,343, Patent No. 1,243,050, and a division of my said application bearing Serial No. 195,637, Patent No. 1,319,142, and the parts of an apparatus or mill, such as I prefer to employ to carry out my invention and shown in the accompanying drawings, are illustrative of parts of my said Patent No. 1,243,050 and my said Patent No. 1,319,142.

The method of and means I prefer to employ for producing car wheels or other circular articles embodying my invention form no part of this invention, as this is claimed in and the present invention is also described or partly described in the following applications filed by me, viz: Said original application for patent filed June 15, 1911, Serial No. 633,343, Patent No. 1,243,050; application for patent filed October 10, 1916, Serial No. 124,921, Patent No. 1,243,051; application for patent filed November 20, 1916, Serial No. 132,372, Patent No. 1,243,052; application for patent filed November 22, 1916, Serial No. 132,815, Patent No. 1,243,053; application for patent filed January 10, 1917, Serial No. 141,558, Patent No. 1,246,067; application for patent filed June 22, 1917, Serial No. 176,333, Patent No. 1,319,141; and application for patent filed October 9, 1917, Serial No. 195,637, Patent No. 1,319,142.

The invention relates to car wheels or other circular articles formed integral or in one piece and having a central or hub and web portion, and a rim or marginal portion.

In my said original application, the car-wheel or other circular body is centrally pierced or penetrated or centered and is rolled or formed by rolls operating against opposite sides and against the peripheral face of the work-piece and is dished while the work-piece is rotated by said rolls.

Applicant is aware that heretofore it has been proposed to roll car-wheels on a forming-die shaped to conform to the central or hub part, the web part and the rim part at one entire side of the car wheel to be formed and also to conform to the outer or peripheral face of the car-wheel, the car-wheel being rolled on its other side only; that is, at one side of its web and at one side of the edge of its rim. During such rolling action, a work-piece of a given diameter will be rolled to much larger diameter and to the form of a car-wheel, such larger diameter being determined and governed by said forming-die. With such an arrangement, the metal in the work-piece is not worked at its outer peripheral face and therefore will be extended instead of being compressed; thus producing incipient cracks in the tread or outer peripheral face of the rim of the car-wheel In this invention, which is the product of the invention covered by my aforesaid application filed October 9, 1917, Serial No. 195,637, Patent No. 1,319,142, the car-wheel or similar circular article is formed by combined roll-forging and die-forging means into undished form and is then dished while the same revolves, or left undished, it being pierced or penetrated or centered and rolled at one side, thereby forcing metal of the work-piece against the forming-die, against or over a center or piercer passed axially through said forming-die or formed integral with said die, and into the depressed portion or portions of said die and also beyond and over the peripheral edge of said die, the actual forming portion of the preferred forming-die reaching only to the inner peripheral face of the rim of the car-wheel or other article at one side thereof when finished and being shaped to conform to the central or hub and web part and the inner peripheral or inner circumferential face of the rim portion of the finished rolled or formed car-wheel or other circular body at one side thereof; all other portions or surfaces of the car-wheel or other body being rolled or formed directly by rolls and the car-wheel or other circular body being dished while the same revolves or left undished, all as and in the manner hereinafter shown and described. During the entire rolling or operating process the metal at the peripheral face of the work-piece is worked by a roll or rolls, whereby the metal in the whole rim portion is rolled or worked to uniform and maximum density, or practically so.

Another object of my invention is to provide, as herein described, such articles wherein, during the forming of the marginal or rim portion thereof, the metal has been compressed to greater density than the metal in the central or hub and web portion.

Another object is to provide, as herein described, such articles wherein, during the forming process, the metal in the marginal or rim portion, except the metal forming the periphery or flanged tread portion, has been worked or compressed to greater density or refinement than the metal in the central or hub and web portion, and the metal forming the periphery or flanged tread portion has been worked or compressed to still greater density or refinement than the metal in the remainder of said marginal or rim portion.

Another object is to provide, as herein described, such articles wherein the periphery or flanged tread portion is formed of metal of harder and of greater strength than the body portion.

Another object of my invention is the provision, as herein described, of such articles wherein the marginal or rim portion is formed stronger, more true and more durable than have heretofore been produced.

Another object is to provide such articles which are completely formed, as and in the manner herein described, and wherein the metal in the marginal or rim portion is compressed to uniform and to its maximum density or refinement, or approximately so.

Another object is to provide, as herein described, such articles in either dished or undished form and composed of the qualities of metal as specified in the foregoing objects of my invention.

Another object is the provision, as herein described, of a dished or undished wheel which is free or substantially free from initial or inherent stresses or strains.

Another object is to provide, as herein described, such articles as above specified, each formed in one heat with all its surfaces smooth and all its angles sharp and free from fins or other undesirable projecting part or parts.

Another object is to provide, as herein described, such articles as above specified, each formed at one or both sides with a preliminary central hole or a part or parts thereof, all in one heat in the same apparatus or mill.

Another object is to provide, as herein described, such articles which are true to their axes and which when on their axles or shafts are truly balanced or approximately so.

Another object is to provide such articles which, when completely formed, as herein described, have their central or hub and web portions and their marginal or rim portions formed smooth without leaving any raised portions or fins which would have to be removed afterward by turning or other costly means.

A further object is the provision of a wheel having a central or hub and web portion and a rim or marginal portion, said central portion including the inner peripheral faces of said rim being die and roll-forged and the rim or marginal portion including the outer peripheral face thereof being roll-forged caused by rolls operating against the opposite sides and against the peripheral face of said rim portion, said wheel being formed from an ingot, bloom, blank or other work-piece and having its hub pierced or penetrated.

A further object is to provide a car-wheel which may be partly die and roll-forged and partly roll-forged with one heat and without surplus metal which would have to be removed afterward by turning or other costly means.

A further object is to provide a car-wheel wherein also the hub portion is die and roll-forged and formed smooth and to proper form.

Further objects are to provide a rudimentarily formed car-wheel having its central portion die and roll-forged and being rolled on its periphery with two cylindrical or approximately cylindrical portions, one of which is of greater diameter than the other, and an intermediate concaved or conical, or approximately concaved or conical portion merging into said cylindrical portions, to provide a rudimentarily formed car-wheel, the inner peripheral face or faces of whose rim portions are formed sufficiently inclined outwardly toward the periphery of the wheel to have condensed or compressed the metal therein to uniform or to practically uniform density.

Further objects are to provide a car-wheel or similar body whose peripheral face has been rolled, first to rudimentary form, or rolled for instance with two cylindrical or approximately cylindrical portions, one of which is of greater diameter than the other, and an intermediate concaved or conical, or approximately concaved or conical portion merging into said cylindrical portions, and which rudimentarily formed peripheral face has been then rolled to finished form; to provide a car-wheel or similar body, one of the inner peripheral faces of whose rim portion has been rolled or formed first to rudimentary form, or rolled or formed sufficiently inclined outwardly toward the periphery of the wheel to have condensed or compressed the metal in the rim portion to uniform or to practically uniform density and which peripheral face has been then rolled to finished form; and to provide a car-wheel otherwise improved over wheels as now made.

Still further objects are to provide car-wheels or similar objects, which have been completely formed in undished form, from properly heated ingots, blooms, blanks or other work-pieces, including the piercing, or penetrating, or forming at opposite sides of the work-piece of a rudimentary bore, or a part or parts thereof, while at the same time having secured a uniform and maximum density and homogeneity in the metal therein, which contributes materially to the strength and durability thereof. For instance, the metal in this wheel or similar article, when being formed from a blank or other work-piece according to my invention, is not expanded radially, especially is this avoided in the tread and flange or rim portion and therefor there is no possibility of the formation of incipient cracks in the tread and flange portion or in the peripheral face of the rim.

The invention consists in the novel car-wheels or other circular articles of manufacture formed integral or in one piece and having a central or hub and web portion, and a rim or marginal portion, herein described and more particularly pointed out in the claims, said central or hub and web portion being also termed the "body-portion" of the wheel or other article.

I prefer to carry out my invention with an apparatus or mill such as for instance described and claimed in my aforesaid original application and in applications filed by me and having the hereinbefore mentioned serial numbers and filing dates, as hereinafter described and more fully shown and described in my said application Serial No. 195,637.

In the accompanying drawings, in which I have illustrated my invention together with devices or means I prefer to employ in carrying out my invention:

Figures 1, 2 and 3 are sectional plan views illustrating, in a diagrammatic manner, a portion of one form of a novel apparatus or mill, hereinafter described and also fully described in my aforesaid application filed October 9, 1917, Serial No. 195,637 and, which I prefer to employ in the manufacture of my invention. Therein an ingot, bloom, blank or other work-piece may be centered or pierced or penetrated, formed to desired shape or form, and dished with the use of the forming-die, with all the rolls of the apparatus or mill as herein shown and described, and with the means for centering or piercing or penetrating all as hereinafter described.

Figs. 4 to 20 show sectional views illustrating various combinations and different forms of rolls, piercers or centers, and forming-dies. These figures illustrate, in accordance with my invention, certain piercing or centering or supporting steps and rolling and forming and dishing steps for producing the dished car-wheel shown for instance in Figs. 7, 10, 13, 14, 16 or 20, or in other figures, as hereinafter described.

Fig. 21 is a sectional view showing a portion of another form of forming-die and the centering or supporting means. Therein is shown only the center portion of both a work-piece and the forming-die.

Fig. 22 is a sectional view showing the central portion of the work-piece provided with a large central opening and still another form of centering means in which the centering element at one side of the work-piece is integral with the forming-die. Therein is also shown the central portion only of the forming-die.

Fig. 23 is a sectional view showing the central portion of a work-piece previously formed as shown and provided with central depressions or pockets into which the piercers or centers, are to be penetrated or entered, one of said piercers or centers being shown slidably within the forming-die. Therein is also shown the central portion only of the forming-die.

Figure 57:
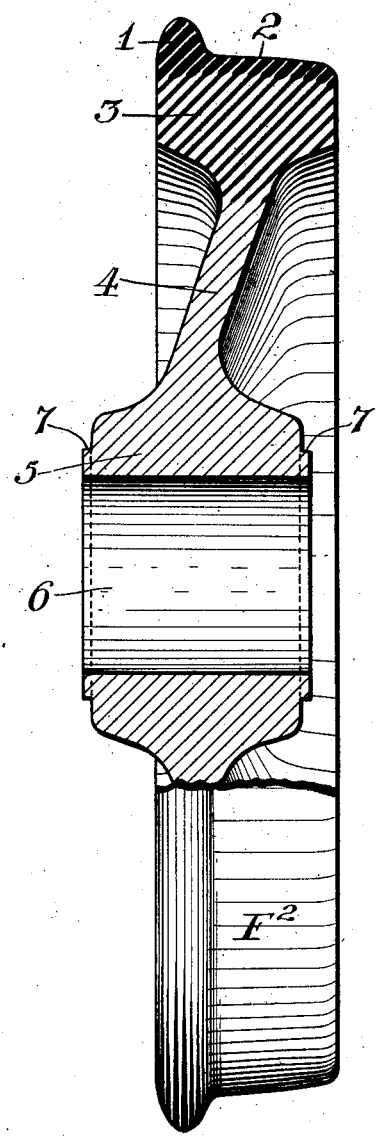

Fig. 24 is a sectional view showing the central portion of a work-piece provided with an axial or approximately axial opening and showing different forms of centering elements at opposite sides of the work-piece, the centering element at one side being in the form of a piercer or center and the other being in the form of a forming-die which also serves in forming a hub portion onto the work-piece. Therein is also shown the central portion only of the forming-die.

Fig. 25 is a sectional view showing a work-piece previously formed as shown and placed against the forming-die, and also showing the centering means. Therein is shown the central portion only of both the work-piece and forming-die.

Figs. 26, 27 and 28 show diametral sections of various additional forms of ingots, blooms, blanks or other work-pieces.

Figs. 29, 30 and 31 show diametral sectional views of car-wheels formed in accordance with my invention, the same being shown with the hub board. In Fig. 29 said car-wheel is shown dished. In Fig. 30 said car-wheel has its web formed in undished position; that is, at right angles with the axis of the wheel, the hub of this wheel, however, is not formed central to the web, but is formed into the position required of a dished wheel, that is, the hub is in the same position as is the hub in Fig. 29. In Fig. 31 said car-wheel is shown undished.

Figs. 32 and 33 illustrate, according to my invention, certain piercing, and die and roll-forging and roll-forging steps for producing the dished car-wheel, for instance shown in Fig. 33; the dishing being accomplished by axial movement of the piercing means.

Figs. 34 to 37 inclusive, illustrate, according to my invention, certain die and roll-forging and certain roll-forging steps for producing the finished undished car-wheel shown in Fig. 37.

Figs. 38 and 39 illustrate, according to my invention, certain die and roll-forging, certain roll-forging and the dishing steps for producing the dished gear-blank, or dished disk-wheel or center with the forming-die and piercers or centers formed as shown, and with the rolls shown.

Figs. 40 and 41 illustrate, for instance, certain steps acording to my invention for reworking or reforming a car-wheel, including the reworking of its hub.

Fig. 42 is a diametral section of a completely formed and dished car-wheel such as for instance shown in Fig. 33; said section being taken on line 42—42, Fig. 43, and showing the inner peripheral surface of the rim at one side of the work-piece formed to a different angle than the inner peripheral surface at the other side thereof, one of said inner peripheral faces being die-formed and the other being rolled to form.

Fig. 43 is a fragmentary plan view of the completely finished car-wheel, such as shown in Fig. 33, die and roll-forged and roll-forged in accordance with my invention.

Fig. 44 is a diametral section of a car-wheel completely formed and dished, as herein described, and showing the inner peripheral face of the rim at one side of the car-wheel formed to the same angle as the inner peripheral face at the other side thereof.

Figs. 45 and 46 illustrate diagrammatically improper flow of metal resulting from improper working of the metal in the rim portion of a car-wheel or other circular article having a web formed integral with the rim portion, during the forming of said rim portion, all of which is avoided in the manufacture of my invention.

Fig. 47 illustrates, for instance, the proper flow of metal during the forming of a tire having no web, such as used for some tired car-wheels.

Figs. 48 and 49 are diagrammatical illustrations showing more fully the result of forming the rims of car-wheels embodying my invention, as illustrated for instance on a small scale in Figs. 4 to 7, Figs. 11 to 14, Figs. 15 and 16, Figs. 17 to 20, and Figs. 34 to 37.

Figs. 50, 51 and 52 are similar diagrammatic illustrations showing the result of forming the rim of a car-wheel or other circular body directly to finished form, in accordance with my invention. Fig. 51 shows the rim portion formed with its flanged tread direct to finished form, with the exception of rounding the outer corners of the flange and tread, and Fig. 50 shows said corners about to be rounded to the form as indicated in dotted lines, with a separate finishing roll. Fig. 52 shows the rim portion having, for instance, a straight peripheral face rolled direct to desired finished form.

Figs. 53 to 56 inclusive, show the flange and tread portions of car-wheels and are diagrammatic views illustrating for instance a few shapes or ways of "beaking" as herein named and as hereinafter described and also described in my said applications Serial No. 633,343 filed June 15, 1911, and Serial No. 195,637, filed October 9, 1917.

Figure 58:
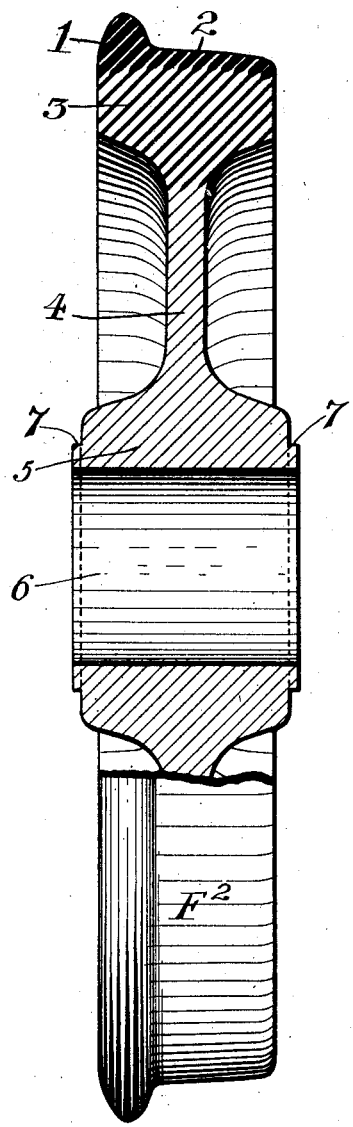

Figs. 57 and 58 are enlarged sectional elevations of car wheels embodying my invention, the same being shown with the hub bored. Fig. 57 shows the car wheel in dished form, and Fig. 58 shows the car wheel in undished form. In said Figs. 57 and 58 is also shown the metal condensed during the formation of the wheel by graduated section lines or section lines of different widths, which show the metal in the whole rim portion except the metal forming the peripheral or flanged tread portion uniformly condensed and to a greater extent than the metal in the central portion or hub and web portions, as shown at 3 Figs. 57 and 58, and the metal forming the peripheral or flanged tread portion condensed to a still greater degree than said metal in said rim portion, as shown at 1 and 2 Figs. 57 and 58. The reference characters 4 and 5, in Figs. 57 and 58 designate the hub and web portions or the central or body portion of the wheel.

In Figs. 8 to 10 and Figs. 17 to 20 is illustrated, for instance, the process, or steps, I employ in the production of my improved car-wheel or similar body whereby the entire end face of the hub of the work-piece, at one side thereof, is rolled or formed or operated upon directly with the herein named edging and web rolling roll, during the process of forming the hub.

It is, of course, to be understood that I do not intend to limit myself to the use of the particular parts herein shown, nor to the use of the remaining parts of the apparatus or mill shown and described in my said applications, Serial No. 633,343, filed June 15, 1911, and Serial No. 195,637, filed October 9, 1917, as other means may hereafter be devised for carrying out my invention in a practicable manner.

Similar characters of reference indicate corresponding parts throughout the several views.

M, M$^{50}$ are the herein named work-supporting heads. Although so named, they also serve other purposes, as will be observed from the matter hereinafter described and also from my said original application. E, E, are the spindles or axles, named herein the work-supporting axles. Said heads M, $M^{50}$ are longitudinally movable and each axle E is adapted to be longitudinally moved or operated together with its piercer or center either independent of its supporting head or together with its supporting head. The axles E, E are rotatably supported in said supporting heads M, $M^{50}$ and are arranged in alinement; one, with its supporting head M, being arranged at one side of the work-piece when the same is positioned in the apparatus or mill, and the other, with its supporting head $M^{50}$, being arranged at the other side of said work-piece or at one side of the forming-die, as shown in the drawing. These axles are longitudinally movable and in addition to serving to support the work-piece also serve other purposes, as herein shown and described.

One of said axles E, E, that is the one which is supported in the supporting head M, has one of the herein-named piercers or supporting centers detachably secured to its inner or operating end, as shown. The other axle, which is supported in the supporting head $M^{50}$, has one of the herein-named piercers or supporting centers detachably secured to its inner or operating end, which piercer or center is passed through the forming-die, as for instance shown, or is formed integral with the forming-die, as for instance shown. Said axles are interchangeable for different lengths or differently formed axles, as may be required. Although so named, these piercers or centers also serve other purposes and they are longitudinally moved or operated with their supporting axles E, E, as hereinafter described.

The piercers or supporting centers for the axle in the supporting head M are interchangeable, either on said axle or with said axle, and may have many different forms or shapes, as for instance: $E^1$ in Fig. 17 or 25; $E^2$ in Fig. 40; $E^3$ in Fig. 21; $E^4$ in Fig. 22; $E^5$ in Fig. 24; $E^6$ in Fig. 1, 2, 3, 23, 32, 34, or 38; $E^{13}$ in Fig. 4; or as for instance $E^{15}$ in Fig. 8, 11 or 15, &c. There is practically no limit to the forms or shapes that said piercers or supporting centers may have.

The piercers or supporting centers for the axle in the supporting head $M^{50}$ are interchangeable, either on said axle or with said axle, and may have many different forms or shapes, as for instance: $E^9$ in Fig. 1, 2, 3, 17, 23, 32, or 38; $E^{10}$ in Fig. 34; $E^{14}$ in Fig. 4; or as for instance $E^{16}$ in Fig. 8, 11, or 15, &c. There is practically no limit to the forms or shapes that said piercers or centers may have.

Said piercer or supporting center for the axle in the supporting head $M^{50}$ has one of the herein-named forming-dies, for instance $W^1$, or $W^3$ &c., which dies may have many different forms or shapes, as for instance: $W^1$ in Fig. 1, 2, 3, 23, or 32; $W^3$ in Fig. 40; $W^6$ in Fig. 4; $W^8$ in Fig. 34; $W^9$ in Fig. 38; $W^{12}$ in Fig. 17; $W^{14}$ in Fig. 8; $W^{15}$ in Fig. 21; $W^{16}$ in Fig. 22; $W^{17}$ in Fig. 24; $W^{18}$ in Fig. 25; $W^{19}$ in Fig. 11; or as for instance $W^{20}$ in Fig. 15. Said forming-die is supported or partly supported by said piercer or center in such manner that while it is rotated by rolls or the work-piece or by both rolls and the work-piece, during the operating process, it also rotates said piercer or center together with the axle to which said piercer or center is secured. Said forming-die may also be supported and rotated as for instance described in my said application Serial No. 195,637 filed October 9, 1917. Each forming-die, in preferred form, is of a diameter which reaches only to the inner peripheral face of the rim at one side of the finished car wheel or other finished circular object and is shaped to conform to the center or hub and web part and the inner peripheral or inner circumferential face of the rim portion of the finished car wheel or other circular body at one side thereof. Inside of the inner peripheral face of said rim the forming-die is shaped to conform to the shape or form which the undished car-wheel or other object is to have at said one side inside of said inner peripheral face of the rim portion, as shown. All other portions or surfaces of the work-piece including the peripheral face thereof are rolled directly by rolls, as hereinafter more fully described. During the entire rolling or operating process, with the forming-die in said preferred form, the metal at the peripheral face of the work-piece is worked directly by a roll or rolls.

Said preferred forming-dies are each formed to provide the work-piece at one side thereof with a hub portion, a web portion and an inner peripheral face of a marginal or rim portion, or they are formed as and for the purpose hereinafter described.

F, $F^1$ and $F^2$ designate the work-piece from some of the various forms or shapes it may have when put into the apparatus or mill to some of the various forms or shapes which the finished article or product may have. For instance, F designates the ingot, bloom, blank or other work-piece in a few of the various forms or shapes it may have when put into the apparatus or mill, either solid, as for instance F in Figs. 17, 21 and 32, or, it may be previously formed or pierced, as for instance F in Fig. 4, 8, 11, 15, 24, 25 or 28; or it may have a central hole, as for instance F in Fig. 22 or 27, or as $F^1$ in the Fig. 40; or, it may be previously formed into the shape shown, for instance, at F in Fig. 23, 26 or 27, or, previously cast into any suitable form or shape, as for instance F in the Fig. 26 or 27; or, it may be a previously formed or rolled car wheel or other previously formed body to be reworked or re-formed, as for instance the car-wheel or work-piece $F^1$ in Fig. 40, which is shown re-worked or re-formed to the form or shape shown at $F^2$ in Fig. 41. Such previously rolled or otherwise formed car-wheel or other article to be re-worked or re-formed, as herein described, in my apparatus or mill may also have any of the forms or shapes shown at $F^2$ in Fig. 29, 30, 31, 39 or 41, or as shown at $F^1$ in Fig. 12 or 38. There are a great many forms or shapes that the ingot, bloom, blank or other work-piece or previously finished article may have when put into the apparatus or mill to be re-worked or re-formed as for instance $F^2$, which represents the finished article or finished product from my apparatus or mill, either dished or undished.

J, J designate the roll shafts, one of which has at its inner or operating end one of the herein named edging and web rolling rolls, and the other has at its inner or operating end one of the herein named edging and die-supporting rolls. Although so named, these rolls also serve other purposes as hereinafter described.

Said edging and web rolling rolls are interchangeable and may have many different forms or shapes, as for instance $J^1$ in Fig. 1, 2, 3, 4, 32, 38 or 40; $J^7$ in Fig. 34; or as for instance $J^{69}$ in Fig. 8, 11, 15 or 17, &c. In the preferred apparatus for producing car-wheels, or other circular article embodying my invention, the said edging and web rolling roll may be either removably attached to its shaft in such a way that the whole roll may be driven by its shaft, or only part of the roll may be driven by its shaft and the other part or parts be permitted to turn loose; or the whole roll may be permitted to turn loose on a journal formed on its shaft or on a journal removably fastened to its shaft, all as fully described in my said original application. There is practically no limit to the forms or shapes that this roll may have.

Said edging and die-supporting rolls are interchangeable and may have many different forms or shapes, as for instance $J^{59}$ in Fig. 1, 2, 3, 32, or 34; $J^{60}$ in Fig. 38 or 40; $J^{61}$ in Fig. 4, 8, or 17; $J^{70}$ in Fig. 11; or as for instance $J^{74}$ in Fig. 15. In the preferred apparatus for producing car-wheels or other circular articles embodying my invention, the said edging and die-supporting roll for instance, $J^{59}$, $J^{60}$ or $J^{61}$, &c., may be either removably attached to its shaft in such a way that the whole roll may be driven by its shaft, or only part of the roll may be driven by its shaft and the other part or parts be permitted to turn loose; or the whole roll may be permitted to turn loose on a journal or journals formed on its shaft or a journal or journals removably fastened to its shaft. There is practically no limit to the form or shape that this roll may have.

G, G designate the roll shafts, one of which has at its inner or operating end one of the herein named web finishing rolls, and the other has at its inner or operating end one of the herein named die-supporting rolls. Although so named, these rolls also serve other purposes.

Said web finishing rolls may have many different forms or shapes, as for instance $G^1$ in Figs. 1, 2, 3, 4, 8, 15, 17, 32, 38 or 40; $G^7$ in Fig. 34; or as for instance $G^{55}$ in Fig. 11, &c. In the preferred apparatus for producing car-wheels or other circular articles embodying my invention, the said web finishing rolls are interchangeable, as for instance described in my said original application. There is practically no limit to the shapes that this roll may have.

Said die-supporting rolls are interchangeable and may have many different forms or shapes, as for instance $G^{14}$ in Figs. 1, 2, 3, 4, 8, 17, 32, 34, 38 or 40; $G^{109}$ in Fig. 11; or as for instance $G^{110}$ in Fig. 15. In the preferred apparatus for producing car-wheels or other circular articles embodying my invention, the said die-supporting roll for instance, $G^{14}$ or $G^{109}$ may be either removably attached to its shaft in such a way that the whole roll may be driven by its shaft, or only part of the roll may be driven by its shaft and the other part or parts may be permitted to turn loose; or the whole roll may be permitted to turn loose on a journal or journals formed on its shaft, or on a journal or journals removably fastened to its shaft. There is practically no limit to the forms or shapes that this roll may have.

K designates the herein named tread or face rolling roll which is adapted to act against the peripheral face of the work-piece to roll said face to a beaked or rudimentary form, or to partly finished or to completely finished form and which roll, during the forming process, is moved toward, against or away from the peripheral face of the work-piece. The said movements of said roll are limited or controlled by adjustable stops provided in the mechanism for causing said movements, and by means of said stops the radial distance or distances of said roll from the axis of the supported work-piece may be adjusted or controlled so as to suit any requirement and whereby said roll may be stopped and retained at any desired radial distance from the axis of the supported work-piece. Said tread or face rolling roll may also be supported so as to permit lateral movement of the same and the peripheral face of said roll may have also various different shapes, all as more fully described in my said original application. Said face roll may also serve other purposes and there is practically no limit to the shapes which the peripheral portion of said tread or face roll may have, or to the purpose for which said face roll may be used.

H designates the herein named tread or face finishing roll which is adapted to act against the peripheral face of the work-piece. This roll, during the rolling process, is moved toward, against or away from the peripheral face of the work-piece and the movements of said roll are limited or controlled by adjustable stops provided in the mechanism for causing said movements, whereby the radial distance or distances of said roll from the axis of the supported work-piece may be governed to suit the exact diameter of the car-wheel when finished. After the car wheel has been rolled to its finished diameter, said roll acts as a rolling stop against the peripheral face of the work-piece, car-wheel or other article, and maintains said finished diameter during any further operations against said work-piece, wheel or other article. The peripheral face of said roll may also have many different shapes, as for instance described more fully in my said original application, and as for instance hereinafter more particularly set forth, and said face roll may also serve other purposes; there being practically no limit to the shapes which the peripheral portion of said tread or face finishing roll may have, or to the purpose for which said face roll may be used.

Said face rolls H and K may also be moved toward, against or away from the peripheral face of the supported work-piece, either together or independently of each other, as and in the manner, for instance, more fully described in my said original application.

In rolling or forming as herein described, for instance, car-wheels or other circular articles having each a hub, a web and a marginal or rim portion, the lateral thickness or width of the marginal portion of said face roll K, in most cases, is the same as is the lateral thickness or width which the outer or rim portion of the car-wheel or other article is to have when finished, as is shown for instance at K in the Figs. 1, 2, 5, 6, 7, 9, 16, 19, 20, 35, 37, 39, and 41. As shown in said figures, the opposite side faces of said face roll K are therefore also adapted to act for gaging the lateral thickness or width which the marginal or rim portion of the car wheel or other circular article is to have when finished. In some cases, said face roll K may be formed and be used as a face finishing roll and in other cases said face roll may not be operating against the peripheral face of the work-piece, but may serve other purposes, as for instance shown at K in Figs. 11 to 14. Said face finishing roll H, in some cases, may have a lateral thickness or width which is the same as is the lateral thickness or width which the outer or rim portion of the car wheel or other circular article is to have when finished, in which case the opposite side faces of said roll H serve to act for gaging the lateral thickness or width which the marginal or rim portion of the car wheel or other circular article is to have when finished; and in other cases said face roll H may not be operating against the peripheral face of the work-piece, but may serve other purposes, as for instance shown by the face roll H in Figs. 11 to 14.

A car wheel or similar article may also be formed and dished or not dished, as and in the manner fully shown and described in my said application filed October 9, 1917, Serial No. 195,637, that is to say, for instance, instead of forming and dishing a car wheel or similar article with the use of the herein named piercers, or centers, the forming-die and all the rolls as herein described, for instance, with reference to Figs. 1, 2, 3, Figs. 4 to 10, Figs. 15 and 16, Figs. 17 to 20, Figs. 32 and 33 and Figs. 34 to 37, a car wheel or similar article may also be formed to desired shape and dished or be not dished with only the use of the herein named piercers or centers, the forming-die, the herein named edging and web rolling roll, edging and die-supporting roll, and tread or face rolling roll; or, for instance, with only the use of the herein named piercers or centers, the forming-die, the herein named edging and web rolling roll, edging and die-supporting roll, tread or face rolling roll, and the herein named tread or face finishing roll. The forming of the car-wheel or similar body with only the use of the herein named piercers or centers, the forming-die and said three or said four rolls may, in some cases, give satisfactory results and when so forming the car-wheel or similar body the inner circumferential face or faces of the rim portion may also be formed sufficiently inclined as and for the purpose hereinbefore described with reference, for instance, to Fig. 48, 51 or 52, and the peripheral face of the rim portion may be rolled to any suitable form desired or rolled direct to desired finished form. With any of such arrangements, that is to say, with the use of the forming-die and said three rolls, or with the use of the forming-die and said four rolls, the hub and the web or central portion of the car wheel or similar article may be formed to desired shape with the metal thereof of certain density or refinement and the rim portion of said car-wheel or similar article may be formed to any desired shape with the metal thereof of greater density or refinement than the metal in said central portion.

In Figs. 1, 2 and 3, I have illustrated the device I prefer to use for centering or for piercing or penetrating and centering ingots, blooms, blanks or other work-pieces, for supporting the same, and also for putting the work-pieces at their hubs or center portions while so supported by said piercers or centers, or by said work-supporting centers and said forming-die, into clamped condition laterally or axially between said piercers or work-supporting centers and automatically keeping said hub or center portion in clamped condition by constant pressure during the forming and dishing or undishing processes, &c, as hereinafter more fully described and also described in my said original application; said device coacting with the forming-die for such purpose as will be hereinafter described.

The work-supporting axle E of said head M has one of said piercers or work-supporting centers at one of its ends, as for instance $E^1$, $E^2$, $E^3$, $E^4$, or $E^5$, &c., and the work-supporting axle E of said head $M^{50}$ has one of said piercers or centers at one of its ends, as for instance $E^9$, $E^{10}$, $E^{14}$, or $E^{16}$, &c. Said work-supporting heads M, $M^{50}$ are moved or operated longitudinally in line with the axes of said piercers or work-supporting centers by means of the pressures in the cylinders O and N (see for instance Fig. 1) or by any other equivalent means, toward or away from each other; or they may be moved together in either direction; or one of them may be retained in any position while the other is moved toward or away from the one so retained; or they may be moved as the case may require. One of said work-supporting heads M, $M^{50}$ for instance the head $M^{50}$, is operatively connected with the piston-rod $O^3$ of the piston in cylinder O and is moved by the pressure in said cylinder. The other work-supporting head M is operatively connected with the piston-rod $N^3$ of the piston in cylinder N and is moved by the pressure in said cylinder.

In Figs. 1, 2 and 3, O is the said pressure cylinder for the work-supporting head $M^{50}$ located at one side of the work-piece or at one side of the forming-die, for instance $W^1$; and, N is the pressure cylinder for the work-supporting head M located at the other side of the work-piece or at the other side of said forming-die $W^1$. Cylinder O has a piston with a piston-rod $O^3$ and a piston-rod $O^2$ passing through both the cylinder heads $O^{15}$ and $O^{16}$ (see Fig. 1) at both ends of cylinder O. The piston-rod $O^3$ is firmly connected with said work-supporting head $M^{50}$. The details and description of the cylinder N and its connecting parts for the head M at the other side of the work-piece, are similar to those described above, and the characters of reference N to $N^3$, &c., indicate the corresponding parts O to $O^3$, &c. In said Figs. 1, 2 and 3 said work-supporting heads $M^{50}$ and M are operated by the pressures in said cylinders O and N acting against the pistons of said piston-rods $O^2$, $O^3$ and $N^2$, $N^3$.

By the words "centering, or piercing or penetrating and centering" used herein, I mean that, the ingot, bloom, blank or other work-piece is centered, or pierced or penetrated by the apparatus or mill, by forcing either one or both of said piercers or work-supporting centers, hereinafter more fully described, against or into the work-piece by their said pressure means (see Figs. 1, 2 and 3), when the outer portion or periphery of said work-piece is brought coaxial, or approximately coaxial, with the piercers or work-supporting centers by means of the herein-named positioning, or raising, lowering and retaining device; or metal of the work-piece may be forced over or around any one of said piercers or centers, hereinafter more fully described for instance with reference to Figs. 4, 8, 17, &c.; and this means herein that said work-piece is centered, or pierced or penetrated and centered, because said piercing or penetrating at the same time also centers said work-piece, for the reason that at the beginning of said centering or piercing or penetrating and centering process, the outer portion or periphery of said work-piece is then coaxial, or approximately so, with said piercers or work-supporting centers and is central with said forming-die; that is, said piercers or work-supporting centers are then in the center or approximately in the center of the outer portion or periphery of said work-piece.

In Figs. 17 and 18, I have for instance illustrated in brief, one of the piercing or penetrating or centering processes or steps and one of the operations for forming the central or hub portion of a car wheel or other circular body, such as I prefer to employ in carrying out the process of forming car wheels, &c. In Fig. 17, the properly heated blank or work-piece F, shown in diametral section, may have a thickness which is either the same, or greater, or less than the length which the hub of the car wheel or other circular body is to have when rolled to finish. The work-piece F shown in Fig. 17 has been brought into the position shown by the herein named positioning, or raising, lowering and retaining device, such for instance as shown and described in my said original application, in which position the outer portion or periphery of the work-piece is coaxial or approximately so with the piercers or work-supporting centers, for instance $E^1$, $E^9$, and central with the forming-die, for instance $W^{12}$ and in which position, the work-piece F is pierced or centered, for instance as described in the following: The supporting-head $M^{50}$ with its piercer or center $E^9$ and forming-die $W^{12}$ and the die-supporting roll $G^{14}$ and the edging and die-supporting roll $J^{61}$ are moved and adjusted into the position shown, in which positions the flange or shoulder $e^{37}$ of said piercer or center $E^9$ is against the shoulder formed in said forming-die $W^{12}$ and holds the same against or in contact with the supporting portions of said rolls $G^{14}$ and $J^{61}$ and, the supporting or edging portion $g^{137}$ of said roll $G^{14}$ is in contact with one of the sides of the peripheral face finishing roll H, which roll H is a certain radial distance from the axis of the piercers or centers $E^1$, $E^9$, as for instance shown, and the edging roll part $j^{29}$ of the edging and die-supporting roll $J^{61}$ is in contact with one of the sides of the face roll K, which roll is in contact with the peripheral edge of said forming-die $W^{12}$ at the commencement of the operation, as shown. In these illustrations, the roll $G^{14}$, the roll $J^{61}$, and the forming-die $W^{12}$ are retained in said positions during the operating process, and during the dishing or rolling and dishing processes, said piercer or center $E^9$ is axially moved or forced into the position shown in Fig. 20 by its power or pressure means operatively connected therewith. During the actual piercing or penetrating or forming process illustrated in Figs. 17 and 18, the piercer or center $E^1$ is forced into one side of the work-piece F, while said edging and web rolling roll, for instance $J^{69}$, formed as shown, rotates or assists in rotating the work-piece together with its forming-die $W^{12}$ and is forced or rolled against and into said side of the work-piece, thus causing the work-piece at its other side to be forced over the other piercer or center $E^9$ and causing metal of said work-piece to be forced into the hub-forming cavity of the forming-die $W^{12}$ and around said piercer or center $E^9$, thus forming the hub at the side of the work-piece adjacent said forming-die $W^{12}$. During said hub forming process, the end of the roll part $j^{43}$ of said roll $J^{69}$ is either in contact with the peripheral face of said piercer or center $E^1$, as for instance shown in Figs. 17 and 18, or comes against said peripheral face of said piercer or center $E^1$ during the hub forming process and thus rolls or forms the hub at the other side of the work-piece while the work-piece is forced against said forming-die and is rolled or formed to the form shown in Fig 18. During this process, the roll portion $j^{43}$ of said roll $J^{69}$ operates against the end face of the hub as shown and the edging roll portion $j^{29}$ of said roll $J^{69}$ operates against the portion of the side of the work-piece between the web rolling part $j^{28}$ of said roll $J^{69}$ and the periphery of the work-piece, as shown in Fig. 18. During this operation, the face roll K will operate upon the peripheral face of the work-piece continually and as the work-piece increases in diameter, said face roll K moves with the enlargement of said diameter, while metal in the peripheral portion of the work-piece has been forced over the inclined peripheral face or edge $W^3$ of said forming-die $W^{12}$ and against the edging roll portion $j^{29}$ of said edging and die-supporting roll $J^{61}$, as shown in Fig. 18. Thus the work-piece is centrally pierced or penetrated or centered and the hub of the work-piece formed to the desired form and length. Said piercing or penetrating or centering may be done either before or during said hub-forming process, and said positioning, or raising, lowering and retaining device may be moved away from the work-piece either after or during the piercing or penetrating process. The side of the work-piece next to the forming-die may also be first pierced or penetrated before operation with the rolls, as shown and described in my said application filed October 9, 1917, Serial No. 195,637, that is, when the work-piece is in proper position, the piercer or center for instance $E^9$ is forced into the work-piece while the forming-die $W^{12}$ and the rolls $G^{14}$, $J^{61}$, H and K are retained in the positions shown in Fig. 17.

In case that all the rolls of the apparatus or mill are all used for forming a wheel or other article, as shown for instance in Figs. 1, 2, and 3, the forging or forming operation against the blank or work-piece having one side against the forming-die may begin with the herein named edging and web rolling rolls formed as shown, the edging and die-supporting roll formed as shown, the tread or face rolling roll formed as shown, the forming-die formed as shown, the piercer or center of supporting head M formed as shown, and the piercer or center of supporting head $M^{50}$ formed as shown, and with these parts the blank or other work-piece may be rolled or formed to either of the forms or shapes $F^1$, such as shown for instance in any of the Figs. 1, 35 or 38, &c, or similar forms; but in case the finished article should be a dished car wheel having the form or shape shown, for instance, in Fig. 3, the ingot, bloom, blank or other work-piece having been forged or formed by the herein named edging and web rolling roll, for instance $J^1$, edging and die-supporting roll, for instance $J^{59}$, the tread or face rolling roll K, the forming-die $W^1$ formed as shown, the piercers or centers $E^6$ and $E^9$ formed as shown, to the form or shape $F^1$ in Fig. 1, and with said rolls and forming-die in the position shown in said Fig. 1, the herein named web finishing roll, for instance $G^1$, and tread or face finishing roll H, may begin the finishing operation against the work-piece $F^1$, and during said finishing operation the wheel may also be dished in the following manner:—

With the said work-piece $F^1$ in Fig. 1 supported on the piercers or work-supporting centers, for instance $E^6$, $E^9$, and on said forming die $W^1$, and with the hub or center portion of the work-piece automatically and firmly clamped laterally between said piercers or work-supporting centers, as shown in Fig. 1, the piston-rod $N^3$ of the cylinder N with said work-supporting head M and its axle E and piercer or work-supporting center, for instance $E^6$, now under constant and continuous pressure from said cylinder N, causes said one piercer or work-supporting center $E^6$ to press automatically and continuously toward and against the hub or center portion of this one side of said work-piece $F^1$, while the piston-rod $O^3$ of the cylinder O with the other work-supporting head $M^{50}$ and its axle E and piercer or work-supporting center, for instance $E^9$, now under constant and continuous pressure from the cylinder O, causes said other piercer or work-supporting center $E^9$ to press automatically and continuously toward and against the hub or center portion of said work-piece $F^1$ at the other side of said work-piece, as shown in Fig. 1. With the various parts thus positioned, the dishing may take place, while the work-piece is rotating, in the following manner:—While either, any or all the driven or all the rolls are in operation, and while the said rolls $G^{14}$ and $J^{59}$ and forming-die $W^1$ are retained in fixed rotatable positions, as shown, and with the marginal or rim portion of the work-piece in contact with the forming-die $W^1$ by reason of pressure being applied thereagainst by, for instance, the roll $J^1$, the pressure in said cylinder N is gradually somewhat relieved or reduced, retaining therein however, the constant pressure required in said cylinder N to retain the aforesaid automatically axially clamped condition of the hub or center portion of said work-piece between said piercers or work-supporting centers $E^6$, $E^9$; thereby causing the pressure or force from the cylinder O to overcome the resistance of the piston-rod $N^3$ and gradually move the pistons and their rods $O^2$, $N^2$ and $O^3$, $N^3$, with their said heads M, $M^{50}$ with the center or hub portion of the work-piece or car-wheel axially into the position shown in Fig. 2 while the work-piece or wheel is rotating and the marginal or rim portion of the work-piece or wheel is supported and retained by said forming-die $W^1$ and said roll $J^1$, or by said forming-die $W^1$ and both said rolls $J^1$ and $G^1$ against said axial movement of said center or hub portion. In the position and form shown in Fig. 2 at $F^2$ the work-piece or wheel is dished as shown, and in this position, if necessary or desired, the rolls may still be in operation against or in contact with the work-piece or wheel, as for instance shown in Fig. 2. It is to be noted that the center or hub portion of the work-piece or car-wheel, during this dishing or dishing and rolling process, is firmly held in said automatically clamped conditions between said piercers or centers $E^6$, $E^9$, while said piercers or centers and said forming-die are rotating with the work-piece or wheel.

Instead of so reducing the constant pressure in cylinder N, said dishing can also be done in the same manner, while the work-piece is rotating, by increasing the constant pressure in cylinder O so as to overcome the constant pressure in cylinder N. During the dishing or rolling and dishing operation, the rim or the wheel or other article is supported and retained by the rolls, as shown, which also retain said forming-die $W^1$ in proper position, as shown in Fig. 1 or 2. After the wheel or other article is completely dished and finished, the rolls may be pulled back, as shown in Fig. 3 and the finished wheel $F^2$ is taken away and another properly heated ingot, bloom, blank or other work-piece put in place of it and centered, or pierced or penetrated and centered, &c., as above described.

The dishing, undishing or redishing operating may also be effected by retaining said work-supporting axles or work-supporting means in fixed rotatable positions while the work-piece is rotating and is so rotatably supported at its center or hub portion by said work-supporting means and is so laterally or axially clamped between said work-supporting means, as and in the manner before described, by moving the rolls for instance $J^1$, $J^{59}$, forming-die for instance $W^1$, and roll K in a lateral direction while the same, or at least the rolls $J^1$, $J^{59}$ and forming-die $W^1$ are kept in contact with the marginal or rim portion of the work-piece. In thus applying my invention for dishing, the marginal or rim portion of the work-piece together with the forming-die $W^1$ are moved laterally or axially with respect to its central portion; or, for producing the same effect, both said central work-supporting means and said rolls together with the forming-die may be moved in opposite directions parallel with the axis of the supported work-piece, while said work-piece at its center or hub portion is so supported and is so laterally or axially clamped and while said roll $J^1$ is kept in contact with one side of the marginal or rim portion and said roll $J^{59}$ is kept in contact with the forming-die $W^1$ and also in contact with the other side of the marginal or rim portion of the work-piece, Undishing and redishing may be done in a manner similar to the dishing. In undishing, the dished object is placed partly on the forming-die and partly on said work-supporting centers, as for instance shown in Fig. 20, and while so supported, both the piercers or centers for instance $E^1$, $E^9$, are moved axially until the work-piece or wheel is undished, as for instance shown in Fig. 19.

In a dished wheel, the web, that is the part of a wheel between the hub part and the rim part, is in an inclined position, as for instance shown in the wheel $F^2$ in Fig. 29, and in an undished wheel the web is in a straight position, that is, at right angles with the axis of the wheel, or approximately so, as for instance shown in the undished finished wheel $F^2$, in the Fig. 31. On this account, the said web is longer in the said dished position than in the said undished or straight position, and, the extra length or difference between the length of the web of a dished and undished wheel has to be made up during the dishing process. For example, in case that a wheel has been finished by any means to the form or shape shown, for instance at $F^2$ in Fig. 31, and, such wheel is to be dished to the form or shape shown, for instance, at $F^2$ in Fig. 29, and, in case such dishing would have to be done, for instance, in the usual manner or through pressure in dies, then in such dishing process, the said web would have to be lengthened by direct extension of the metal in the web in the direction from the hub to the rim part, or vice versa. Under such methods, an immense force is required to do such dishing, and during such dishing process it will also be possible to twist the finished rim part with its tread and flange and cause the wheel to be untrue and out of gage. Moreover, such methods will leave an initial or inherent stress or strain in the finished wheel, which forces the wheel out of true when in service or when it is reheated, for instance, from the brake shoes being pressed against the wheel or otherwise. All such difficulties are prevented with my method of dishing or rolling and dishing herein described, and the force or power required to do the dishing with my process will be very little, as can be easily observed from the following:—With reference to the Figs. 19 and 20 for instance; Fig. 19 illustrates an ingot, bloom, blank or other work-piece rolled or formed with the rolls, for instance $J^{61}$, $J^{69}$, forming-die, for instance $W^{12}$, and face roll K to the undished form or shape $F^1$ shown in Fig. 19; then with the rolls $J^{61}$, $J^{69}$ still in operation, the herein named finishing rolls, for instance $G^1$ and H commence operating against the wheel, and the dishing may be commenced at the same time and in the manner before described, and when completely rolled and dished to the form $F^2$ in Fig. 20, the rolls $J^{61}$, $J^{69}$, $G^1$ and H, in the positions for instance shown in Fig. 20, may still operate against the wheel, whereby the wheel is made perfectly true and to balance, also to gage or gages. The said necessary lengthening of the web is performed during the dishing process with the herein named web finishing roll, for instance $G^1$, as shown for instance in the Fig. 20 and other figures, by rolling out the metal $f$ near the inner rim part at one side of the work-piece or wheel as indicated by the clearance between said inner rim part of the wheel and the web reducing roll part $j^{28}$ of the said roll $J^{69}$, which metal was left there by said web reducing roll part $j^{28}$ of the herein named edging and web rolling roll, for instance $J^{69}$, as shown; and thereby adding during the rolling and dishing process, by my method of dishing, or rolling and dishing, sufficient metal to the web part and providing thereby the required metal for the said extra length to the web part, without producing such above described direct tension in the web, and without leaving any stresses or strains in any part of the so finished wheel.

From the above it will be seen that, with the herein named edging and web rolling roll and the forming-die formed as herein shown and with the inner rolling or operating portion of the web reducing roll part $j^{28}$ of said edging and web rolling roll, for instance $J^1$, $J^7$ or $J^{69}$, &c., formed sufficiently conical in one direction and with the peripheral forming portion or peripheral forming face of the forming-die adapted to form the inner peripheral face of the marginal or rim portion of the work-piece or wheel at its one side formed sufficiently conical in the other direction, as and for the purpose hereinafter fully described with reference for instance to the Figs. 48, 49, 51 and 52, an efficient forging or forming action is obtained, which during the formation of the web part toward the rim part, causes the metal to flow in the proper directions; that is to say, toward the rim part, within the latter, and peripheral thereto. The lateral flow of metal is limited by the roll parts $j^{20}$, $j^{29}$ of the edging and web rolling roll and the edging and die-supporting roll, and when this lateral flow of the metal is thus arrested, the continued flow thereof will be peripheral to the rim. It will be observed that the radial flow of the metal is limited by the rolling surface of the tread or face rolling roll K, and when the radial flow is thus arrested, the continued flow of the metal will be peripheral to the rim, as for instance partly illustrated in Figs. 6, 19, 48, 51 and 52. From this and from the matter described below with reference to Figs. 6, 19, 48, 51 and 52, and with reference to other figures herein shown, it is to be observed that the metal, when being forged or formed from the blank or other work-piece into a wheel or other article as herein described, is, especially in the tread and flange or rim portion, not expanded radially, and therefore does not produce incipient cracks in the tread and flange portions of the rim, but is truly rolled or formed and increases in density with increased working, thus giving to the metal both its due maximum strength and maximum resistance to wear. In other words, this method of forging or forming produces the same effect in the metal of the rim portion as if the web portion of the wheel were not in existence and the rim portion rolled or formed its total width on its inner peripheral surface or surfaces as is done on its outer peripheral surface consisting of the tread and flange. In Fig. 19, for instance, is shown such edging and web rolling roll, for instance $J^{69}$, forging or forming the web and rim parts of the work-piece $F^1$ central with the hub part, as shown and therein with the inner rolling or operating portion of the web reducing roll part $j^{28}$ of the edging and web rolling roll $J^{69}$ formed sufficiently conical and with the peripheral forming face $w^3$ of the forming-die $W^{12}$ also formed sufficiently conical as for instance shown and as and for the purpose hereinafter more fully described, the centers of the pressures caused by the so conically formed inner rolling or operating portion of said web reducing roll part $j^{28}$ of said roll $J^{69}$ and by the so conically formed peripheral face $w^3$ of said forming-die $W^{12}$, are illustrated in the Figs. 48, 51 and 52 as acting at the centers of the lengths of said conically formed inner rolling or operating portions and at right angles thereto against the work-piece, as is indicated by the arrows $p$ and $p^1$ of said pressures, and the resultant pressure $r$ from said pressures $p$ and $p^1$ is therein indicated in the direction shown by the arrow for said resultant pressure $r$, and the actual flow of the metal will be in a lateral, radial and peripheral direction, that is, toward the roll $J^{69}$ in Fig. 19 and toward the portion $w^3$ of the forming die $W^{12}$ and toward the edging roll portion $j^{29}$ of the roll $J^{61}$ (see Fig. 19) and peripheral to the rim and in a radial and peripheral direction; that is, toward the periphery of the work-piece in the direction of the arrow $r$ (see Fig. 48, 51 or 52) and against the face rolling roll K and from there the metal will flow peripheral to the rim, and said lateral flow of metal is limited by said edging roll parts $j^{29}$, $j^{29}$ of said rolls $J^{69}$ and $J^{61}$ (see Fig. 19) from where the metal will flow peripheral to the rim, and the said radial flow of metal is limited by the rolling surface of said tread or face rolling roll K, from where the metal will flow peripheral to the rim.

Figs. 45 to 49 inclusive are sections of the rim portion of car wheels illustrating diagrammatically the flow of metal caused by various forms of rolls or other operating parts, and therein the pressures caused by the rolls or by the roll and forming-die against the surface of the metal in contact with the rolls or in contact with the roll and forming-die are assumed to be uniformly distributed at said surface, as indicated by the arrows pointing against said surfaces and the direction of the flow of metal from said arrows toward the inner region of the rim portion is indicated by the pressure lines of said arrows. The flow of metal illustrated by pressure lines parallel to each other indicate a uniform compression of metal. The flow of metal illustrated by diverging pressure lines indicate that said uniformly distributed pressures at said surfaces in contact with the rolls or other operating parts are becoming less toward the inner region and peripheral face of the rim portion, and therefore the metal in those portions of the rim having said diverging lines is not condensed to the same degree as is the metal in the portions having parallel pressure lines and which degree of condensing becomes less and less as the distances between said diverging lines becomes greater; and if the rim is not rolled at its outer peripheral face simultaneously with the rolling and forming of its inner peripheral faces, the metal will be extended instead of being compressed and thereby produce incipient cracks in the tread or outer peripheral face of the rim. The finished peripheral face of the car wheel is indicated by $f^{12}$ and the outline of each of said sections is shown in heavy lines. In the Figs. 45, 46 and 47 the center line of the rim and adjacent web portion is indicated by $y$, and said inner face or faces of the rim portion in contact with the rolls or other operating parts are indicated by $f^{16}$. In Fig. 45 the portions of the rim in which the metal is not properly condensed is indicated by the distances $d^1$, $d^2$ occupied by said diverging lines. In Fig. 46 the portions of the rim in which the metal is not properly condensed is indicated by the distances $d^3$, $d^4$ occupied by said diverging lines. The rolling or forming of the rim portion as and in the manner described with reference to Figs. 45 and 46 does not properly work the metal in the rim and therefore forms a rim which, during the rolling process, has already been weakened where its strength is needed and of which the tread will wear out quickly and shorten the life of such wheel, all of which may be observed on present wheels in actual use.

In Fig. 47 is illustrated a section of a tire having for instance no web, such as used for some tired car wheels. From this figure it can easily be observed that the metal in such objects having a straight inner face without a web as shown, can be rolled to practically uniform density, as indicated by the parallel pressure lines for the total pressure P, and the metal in the rim portion of car wheels and similar objects having each a web formed integral with the rim, can be forged or formed in accordance with my invention to practically uniform and maximum density, as can be done with rims having no web portion.

Therefore and in order to produce car wheels or other like articles embodying my invention and having said effects or results in the metal of the rim portion of the work-piece or car wheel or other like article as herein referred to with reference to Figs. 48, 49, 51 and 52, and to entirely avoid the improper working of the metal described with reference to Figs. 45 and 46, I form the inner rolling or operating portion of the web reducing part $j^{28}$ of said edging and web rolling roll for instance $J^1$ and the portion $w^3$ of the forming-die, for instance $W^1$ (see Figs. 48, 51 or 52) sufficiently conical, so that, during the operating process against the work-piece, the face of said conically formed portion of $j^{28}$ of said roll $J^1$ is sufficiently inclined from its lateral apex toward the inner end of the roll $J^1$ and the portion $w^3$ of said forming-die $W^1$ is sufficiently inclined from its lateral apex toward the inner end of the roll $J^{59}$; that is to say, that when for instance, the web reducing part $j^{28}$ of said roll $J^1$ and the forming-side of the forming-die $W^1$ are against the finished web, then said face of said conically formed portion of each of said parts $j^{28}$ and $w^3$ is sufficiently inclined from the side of the web outwardly in the direction away from the axis of the work-piece, as for instance in Figs. 6, 19, 48, 51 and 52. Said inclination of each of said parts $j^{28}$ and $w^3$ I therefore form sufficiently large enough so as to roll and form the inner peripheral faces of the rim portion sufficiently inclined outwardly toward the peripheral face of the work-piece so that during the forming of the rim portion, for instance to the rudimentary form shown in the Figs. 6, 19, and 48, the metal is caused to flow in the proper directions to assure compression of the metal in said rim portion to uniform or to practically uniform density, as is distinctly shown and diagrammatically illustrated in Figs. 48, 51 or 52. In Figs. 48 and 49 is diagrammatically illustrated and distinctly shown the result of the forming of the rim of a car wheel in accordance with my invention hereinbefore and hereinafter described with reference to other figures.

Fig. 48 distinctly shows what is meant by the herein used words "sufficiently conical" or "sufficiently inclined" and therein is shown said rim portion formed for instance to the rudimentary form shown for instance in the Figs. 6, 19, and 36 and other figures; and in Fig. 48 is also shown in dotted lines said rim portion rolled to finished form, and the center pressures $p$, $p^1$ are the same as before described with reference to Figs. 48, 51 or 52; the pressure lines for each of said pressures $p$, $p^1$ being parallel to each other in the directions of the arrows and at right angles to said inclined faces of said parts $j^{28}$ and $w^3$. The said pressures $p$, $p^1$ from said sufficiently inclined face of said roll part $j^{28}$ and from said sufficiently inclined face $w^3$ of the forming-die $W^1$ thus applied during the forming of said inner rim portion have formed said inner faces $f^{18}$, $f^{18}$ of the so rudimentarily formed rim portion sufficiently inclined, as distinctly shown by the pressure lines for each of said pressures $p$, $p^1$, which caused the metal during said forming of the rim portion to flow in the proper directions to be compressed to uniform, or to practically uniform density, as distinctly illustrated by said parallel pressure lines for each of said pressures $p$, $p^1$, while at the same time the pressures $p^5$, $p^6$ against the lateral sides of the rim from the edging roll parts $j^{29}$, $j^{29}$ of said rolls $J^1$ and $J^{59}$ have caused the metal to flow into the inner region of the rim in the direction of the arrows of the pressure lines for said pressures $p^5$, $p^6$ and have rolled the rim to desired lateral thickness and while at the same time the pressure $p^7$ against the peripheral face of the rim portion from the face beaking or face roughing roll K having its rolling face $K^7$ formed as shown, has caused the metal to flow also into the inner region of the rim in the directions of the arrows of the pressure lines for said pressure $p^7$ and has rolled said peripheral face to the beaked or rudimentary form $K^7$ as shown, thereby having formed said metal in the rim and adjacent web portion simultaneously on all its surfaces by rolls, with the exception of the one inner peripheral face of the rim formed with the inclined face $w^3$ of the forming die $W^1$ by the action of rolls; all such rolls being situated in a plane passing laterally through said rim and adjacent web portion and having compressed said metal simultaneously on all its surfaces to uniform and maximum density, or practically so, while at the same time the rim portion has been formed to said rudimentary form, shown for instance in the Figs. 6, 19, and 48 and other figures. The so rudimentarily formed rim is then rolled or formed with rolls situated at another point of the rim portion to finished form whereby its metal is still further condensed, as diagrammatically illustrated in the Fig. 49. In Fig. 49, said so rudimentarily formed rim portion formed in accordance with my invention, is shown in dotted lines and the finished rim and adjacent web portion shown formed in accordance with my invention during the finishing rolling process to finished form; is shown in heavy lines, and during the finishing rolling process with the rolls $G^1$ and $H$ operating against the rim portion at another point thereof, with the aid of the forming-die $W^1$ the web finishing roll $G^1$ with its web finishing roll part $g^{136}$ rolls the inclined face $f^{18}$ at one side of the work-piece to the finished form $f^{20}$ while the inclined face $f^{18}$ at the other side of the work-piece maintains its form $f^{18}$. Simultaneously therewith, the peripheral face finishing roll $H$ is rolling said beaked or rudimentarily formed peripheral face $K^7$ to the finished form $f^{12}$ and the edging roll parts $j^{29}$, $j^{29}$ of said rolls $J^1$ and $J^{59}$ (of which rolls the roll $J^1$ may have now been moved somewhat toward the axis of the work-piece, as for instance indicated by the distance $f^{24}$ in said Figs. 48 and 49) are still operating in contact with the sides $f^{22}$, $f^{23}$ of the rim at another point thereof and are limiting the lateral flow of metal and maintaining the lateral thickness in the rim to which the same has been rolled during the operating process described with reference to Fig. 48; the combined action of said forming-die $W^1$ and said rolls $J^1$, $J^{59}$, $G^1$, and the die-supporting roll, for instance $G^{14}$ in Fig. 32, and the face finishing roll $H$ during said finishing process, form the rim and adjacent web portion to the finished form shown in Fig. 49. Said Figs. 48 and 49 distinctly show and diagrammatically illustrate that the metal in the whole rim portion, formed in accordance with my invention herein described, is worked to uniform! and maximum density, or practically so, especially in the tread, flange and root of the flange where the strength and resistance to wear is mostly needed. It is, of course, to be understood that in order to produce said results, the rim portion must be formed first, for instance to rudimentary form, as and in the manner described with reference to Fig. 48, before the same is rolled to the finished form shown in the Fig. 49, and the rolling of the said inclined face $f^{18}$ and the rolling of said beaked peripheral face $K^7$ to their finished forms during the finishing rolling process will not disturb the density of the metal to which it has been compressed during the process described with reference to Fig. 48, but will still more compress the metal, especially so in the tread, flange and root of the flange where the strength and resistance to wear is mostly needed, as can easily be seen from said Fig. 48.

From the foregoing it will now be observed that, in forming for instance car wheels with the edging and web rolling roll and the edging and die-supporting roll formed as herein shown and as and for the purpose described with reference to Figs. 48 and 49, and with the lateral thickness or width of said tread or face rolling roll $K$ being the same as the lateral thickness or width which the rim portion of the car wheel is to have when finished, as is for instance shown in the Figs. 1, 2, 6, 9, 16, 19, 34, 38 and 40, and diagrammatically illustrated in Figs. 48, 51 and 52, thereby, and with said roll $K$ formed as shown and as and for the purpose herein described and diagrammatically illustrated in Figs. 48 and 49, and with the said edging and web rolling roll and said edging and die-supporting roll formed for instance as herein shown and as and for the purpose above described with reference to the Figs. 48 and 49, and with all said edging and web rolling roll and said edging and die-supporting roll and said face roll $K$ and the operating portion $w^3$ of the forming-die situated in a plane passing laterally through the work-piece at one side of its axis, the metal in the peripheral face and the whole rim portion of the work-piece or car-wheel is worked continually, during the forming of the rim to rudimentary form, upon all its surfaces simultaneously with said operating portion $w^3$ of the forming-die and said three rolls so formed and so situated as before said and as shown for instance in Figs. 8, 19, 48 and other figures, and in then rolling the so rudimentarily formed rim to finished form, as and for the purpose for instance described with reference to Figs. 48 and 49, and, which to my knowledge together with the result obtained thereby, as for instance above described with reference to the Figs. 48 and 49 was never done or accomplished before in rolling or forming car wheels, whereby the metal in said peripheral face and in the whole rim portion is uniformly condensed to its maximum, or practically so, thereby giving the metal in said peripheral face and in the whole rim portion its due maximum and uniform strength and its due maximum and uniform resistance to wear; and, as any surplus of metal in the work-piece may be worked during the forming process, for instance, into the inner rim and adjacent web portion, the said peripheral face and the whole rim portion of the car wheel can also be formed, by my process, smooth on all its surfaces to the desired form without leaving a raised circular portion or fin, which would have to be removed afterward by turning or other costly means.

Figs. 50, 51 and 52 are similar diagrammatic illustrations as Figs. 48 and 49. Figs. 50 and 51 relate, for instance, to the rim of a car wheel formed in accordance with my invention with only the use of the forming-die and four rolls; that is, (with reference to Figs. 50 and 51) the rim is formed with the forming-die, for instance $W^1$, the herein named edging and web rolling roll, for instance $J^1$, the herein named edging and die-supporting roll, for instance $J^{59}$, the face rolling roll K having its rolling face $K^1$ formed as shown, and the face finishing roll H. With such an arrangement, the rim portion is formed direct to finished form, with the exception that the outer corners of the tread and flange are rounded to proper form or shape with the finishing roll H situated at another point of the rim. Fig. 52 relates, for instance, to the rim portion of a gear blank, or of a disk-wheel, or of a center such as used for some tired car wheels having a rim portion similar to the one shown at $F^2$ in Fig. 39, and rolled or formed in accordance with my invention, with only the use of the forming-die and three rolls, that is, (with reference to Fig. 52) the rim portion is formed with the forming-die, for instance $W^1$, the herein named edging and web rolling roll, for instance $J^1$, the herein named edging and die-supporting roll, for instance $J^{59}$, and the face rolling roll K having its rolling face $K^3$ formed for instance as shown. With the arrangement shown in Fig. 52 the rim portion is formed direct to finished form, as shown. The pressure lines in said Figs. 51 and 52, and the results derived are similar to the ones described with reference to Fig. 48.

My improved car wheel or other circular article may also be formed as for instance described in the following with reference to Figs. 4 to 7 inclusive, in which I have, for instance, illustrated in brief, a forming process or steps according to my invention, such as I prefer to employ for completely forming and dishing the car wheel shown at $F^2$ in Fig. 7 from a blank or work-piece such as shown at F in Fig. 4 having, for instance, a central hole, as shown. In these figures the forming-die $W^6$ is formed at its one side with a long central hub portion, as shown. The axle E of the supporting-head $M^{50}$ is provided with the piercer or center $E^{14}$. This piercer or center $E^{14}$ is formed with a cylindrical portion $e^{37}$ which is slidably fitted into the bore of the hub portion of said forming-die and centrally supports said forming-die. Said piercer or center $E^{14}$ is also formed with a tapered portion $e^{39}$ on which the work-piece is adapted to be supported and, with a cylindrical end portion $e^{40}$ which is slidably fitted into a central bore $e^{41}$ formed in the center $E^{13}$ of the other supporting head M, as shown. The axle E of the supporting head M is provided with the center $E^{13}$ which has at its outer end next to the work-piece a central bore $e^{41}$ slidable over the end portion $e^{40}$ of said piercer or center $E^{14}$, as shown. The outer end face of this center $E^{13}$ adjacent the work-piece is formed straight and the diameter of said end face of said center is the same or is less than the smallest diameter which the hub at the side of the work-piece adjacent said center is to have when finished. The peripheral face of said center $E^{13}$ is preferably formed conical so as to permit the end face of the roll $J^1$, as shown, to properly come in contact with said peripheral face during the operating process for rolling or forming the hub. The forming-die $W^6$, the die-supporting roll $G^{14}$, and the edging and die-supporting roll $J^{61}$, are moved and adjusted into the proper positions, as for instance shown in Fig. 4, and therein they are rotatably retained during the operating process. In such positions, the roll $G^{14}$ is supporting the forming-die with its die-supporting portion $g^{139}$ in both radial and lateral or axial directions and, with its edging or supporting portion $g^{137}$ it is against or in contact with the face finishing roll H as shown, and the roll $J^{61}$ is supporting the forming-die with its die-supporting portion $j^{40}$, in both radial and lateral or axial directions and with its edging roll portion $j^{29}$ it is against or in contact with the face rolling roll K, as shown. Said die-supporting portion $j^{40}$ of said roll $J^{61}$, or the edging roll portion $j^{29}$ of said roll $J^{61}$ may be rotated or driven by its shaft J and the other part or parts of this roll may be made in a separate part or parts which are permitted to turn loose on a journal or journals provided on said roll $J^{61}$ or on its said shaft J.

In the operation illustrated in Fig. 4, the face roll H is moved a certain radial distance away from the periphery of the forming-die $W^6$, as shown, and the face roll K is against or in contact with the peripheral edge of the forming-die $W^6$, as shown. The supporting head $M^{50}$ with its axle E and piercer or center $E^{14}$ are moved, by the means before described, into the positions shown by the dotted lines, after which the work-piece F is brought into the position shown and said parts $M^{50}$, E and $E^{14}$ are again moved, by the means before described, into the positions shown in Fig. 4, and in which positions said parts $M^{50}$, E and $E^{14}$ are retained until the work-piece is ready to be dished. The center $E^{13}$ of the axle E and supporting head M is then moved, by the said power or pressure means operatively connected with said head M, over said end part $e^{40}$ of said piercer or center $E^{14}$ and against one side of the work-piece F, while simultaneously therewith the roll $J^1$ is forced or rolled into said side of the work-piece and thus forces metal of the work-piece at its other side into the hub-forming cavity of said forming-die $W^6$ and around the portion $e^{39}$ of said piercer or center $E^{14}$, thus forming the hub at both sides of the work-piece, as shown in Fig. 5. During such action and while the work-piece is increasing in diameter, the face roll K is moving away from the periphery of the forming-die $W^6$ and metal of the work-piece is forced over said inclined peripheral face $w^3$ of said forming-die $W^6$ and against the edging roll portion $j^{29}$ of said roll $J^{61}$ as shown in Fig. 5. In this manner the work-piece is rolled or formed to the form shown at F in Fig. 5. During the entire process, the edging roll portion $j^{29}$ of $J^1$ is acting against or in contact with the portion of the work-piece between the web rolling part $j^{28}$ of said roll $J^1$ and the periphery of the work-piece at one side thereof, as shown, and the edging roll portion $j^{29}$ of roll $J^{61}$ is acting against or in contact with the other side of the marginal or rim portion of the work-piece, as shown.

Fig. 5 shows said work-piece F rotatably supported and so formed to the form shown, with its hub completely formed and with the outer end face of roll $J^1$ in contact with or against the peripheral face of said center $E^{13}$, and also with the roll $J^1$ forced into the work-piece at one side thereof and with one side of the work-piece against said forming-die $W^6$ as shown. With the parts thus positioned, the web portion of the work-piece may be reduced or rolled and formed to its desired thickness in the following manner, forming part of said rolling or forming process or steps:—Said roll $J^1$, while operating against the work-piece at one side thereof, may be moved, during the operating or forming process, longitudinally or substantially so from its position adjacent the hub portion, shown in solid lines in Fig. 5 and in dotted lines in Fig. 6, to the position adjacent the rim portion shown in Fig. 6, and during said longitudinal movement or movements of said roll $J^1$, the web reducing roll portion $j^{28}$ of said roll $J^1$ is reducing the thickness of the web portion of the work-piece to its desired thickness and is forming the inner periphery face of the rim of the work-piece at one side thereof to the rudimentary form shown, and also forcing metal of the work-piece over said sufficiently inclined peripheral face $w^3$ of the forming-die $W^6$, whereby forming the inner peripheral face of the work-piece at the other side thereof to the sufficiently inclined rudimentary form shown, and as and for the purpose hereinbefore described with reference for instance to Figs. 48 and 49; or said roll $J^1$ when rolling said web portion to its desired thickness, may be moved longitudinally forward and backward as often as desired. Simultaneously with the longitudinal movement or movements of said roll $J^1$, said face roll K is against or is operating against the peripheral face of the work-piece and rolls the same to the said beaked or rudimentary form, as shown for instance in Figs. 6 and 48. While the roll parts $j^{29}$, $j^{29}$ of said rolls $J^1$, $J^{61}$ are still operating in contact with the lateral sides of the rim portion, said finishing rolls $G^1$ and H, shown at the other side of the axis of the work-piece, begin operating against the so rudimentarily formed rim portion and roll with said roll $G^1$ the so rudimentarily rolled inner peripheral face of the rim of the work-piece at one side thereof to the finished form and roll with said roll H the so beaked or rudimentarily formed peripheral face of the work-piece to the finished form shown at $F^2$, in Fig. 7. During this action, the edging roll parts $j^{29}$, $j^{29}$ of said rolls $J^1$, $J^{61}$ are maintaining the lateral thickness of the rim to which the same has been rolled during the process, and simultaneously with the operations of said rolls $G^1$ and H against the work-piece, the dishing may be done to dish the work-piece or wheel while the same is rotating to the form $F^2$ shown in Fig. 7; which dishing may be done in the same manner as before described, for instance with reference to Figs. 1 and 2, that is:—While either, any or all the driven or all the rolls are in operation, and while the said rolls $G^{14}$, $J^{61}$ and forming-die $W^6$ are retained in fixed rotatable positions, as shown, and while the marginal or rim portion of the work-piece is in contact with the forming-die $W^6$ by reason of pressure being applied thereagainst by, for instance, the roll $J^1$, the constant pressure acting against said power or pressure mechanism operatively connected with the supporting head M is gradually somewhat relieved or reduced, retaining therein however the constant pressure required to retain the aforesaid axially clamped condition of the hub or center portion of the work-piece between said centers $E^{13}$, $E^{14}$, thereby causing the pressure acting against the power or pressure mechanism operatively connected with the other supporting head $M^{50}$ to overcome the resistance of the supporting head M and gradually moving said heads M, $M^{50}$ with the center or hub portion of the work-piece or wheel axially into the position of the dished wheel shown at $F^2$ in Fig. 7. While thus effecting the dishing, the work-piece or wheel together with the forming-die $W^6$ are rotating and the marginal or rim portion of the work-piece or wheel is laterally supported and retained by said forming-die $W^6$ and said roll $J^1$, or by said forming-die $W^6$ and both said rolls $J^1$ and $G^1$ against said axial movement of said center or hub portion. It is to be noted that the center or hub portion af the work-piece or wheel, during this dishing or dishing and rolling process, is firmly held in said automatically clamped condition between said centers $E^{13}$, $E^{14}$ while said centers and said forming-die $W^6$ are rotating with the work-piece or wheel. The work-piece or wheel shown at $F^2$ in Fig. 7 is finished and may be removed by moving the rolls $J^1$, $G^1$, K and H into the positions shown for instance in Fig. 4 and by moving said supporting head $M^{50}$ with its axle E and piercer or center $E^{14}$ into the position shown in dotted lines in Fig. 4, when the work-piece or finished product may be taken out and replaced by another work-piece &c. Said dishing can also be done in the manner hereinbefore described.

It is to be noted that during the entire rolling or forming and dishing operations, said centers $E^{13}$, $E^{14}$ are kept in line by the cylindrical end portion $e^{40}$ of said piercer or center $E^{14}$ being held by said central hole $e^{41}$ of said center $E^{13}$, and while so connected with each other and when the work-piece has been formed during the hub-forming process to the form shown in Fig. 5, said centers $E^{13}$, $E^{14}$ are also forced against the opposite sides of the work-piece as shown in the Figs. 5, 6, and 7, thereby forming one substantial supporting device which is absolutely required in cases where such long piercer or center is to be used.

In rolling for instance the peripheral face of car wheels or similar articles first to a beak or rudimentary shape simultaneously with the forming of the rim portion to the rudimentary form shown for instance in Figs. 6, 19 and 48 and as and for the purpose hereinbefore described with reference to the Figs. 48 and 49, and then to the finished form; the tread or face rolling roll K with its peripheral face formed for instance as shown in Figs. 8, 19 or 48 &c., or a similar face, serves to beak the peripheral face of the work-piece or car wheel before rolling the same to finished form; that is, said roll K serves to preliminarily roll the peripheral face of the work-piece or wheel to beaked or rudimentary shape, for instance, to forms such as shown in Figs. 53, 54, 55 or 56, or to other rudimentary forms; such preliminary actions being herein termed "beaking." During such beaking and forming process the metal in the whole rim portion of the work-piece or wheel is worked continually and simultaneously upon all its surfaces, which gives the metal forming the tread, flange, and the whole rim portion of the work-piece or wheel the required uniform strength and density absolutely necessary for maximum and uniform resistance to wear. After this beaking action is completed, the finishing roll or rolls are brought into action and roll said beaked or rudimentarily formed peripheral face to the finished shape of the tread and flange of the wheel and roll the same to its desired finished diameter as, for instance, shown by the dotted lines $f^{12}$ for said finished peripheral face in Figs. 53, 54, 55 and 56, and diagrammatically illustrated in the Figs. 48 and 49, whereby the metal in the tread and flange and the whole rim portion is still further condensed. The car wheel thus formed in accordance with my invention has its metal uniformly condensed to its maximum where it is subjected to greatest strain and wear, and at the point heretofore considered the weakest.

A car wheel or other circular object may also be rolled and formed, as for instance described in the following with reference to the Figs. 8 to 10, in which I have, for instance, illustrated in brief, a rolling and forming process or steps according to my invention, such as I prefer to employ for completely rolling and forming car wheels, &c., embodying my invention including the rolling or forming of the end face of the hub at one side of the work-piece, directly with the edging and web rolling roll $J^{69}$, and also for dishing the car wheel shown at $F^2$ in Fig. 10, from a blank or work-piece shown at F in Fig. 8 having, for instance, a central hole. In these figures the forming-die $W^{14}$ is formed at one side with a central hub having a bore of two diameters forming a shoulder. The axle E of the supporting head $M^{50}$ is provided with the center $E^{16}$. This center $E^{16}$ is formed with a cylindrical portion $e^{38}$ and an enlarged cylindrical portion or flange $e^{37}$, and at its outer straight-faced end adjacent the work-piece it has a central bore $e^{44}$, as shown. This center $E^{16}$ is slidably fitted into said bore in the hub of said forming-die $W^{14}$, thus supporting said forming-die. The axle E of the supporting head M is provided with the piercer or center $E^{15}$. This piercer or center $E^{15}$ has adjacent its axle-end a cylindrical or slightly tapered portion $e^{42}$, the peripheral face of this portion $e^{42}$ being preferably formed conical so as to permit the end face of the roll $J^{69}$ to properly come against or in contact with said peripheral face during the operating process for rolling or forming the hub, and next to said slightly tapered portion said piercer or center has a tapered portion $e^{39}$ on which the work-piece F with its central hole is adapted to be supported. At the small diameter of said tapered portion $e^{39}$ said piercer or center is formed with a shoulder as shown, and from said shoulder said piercer or center is formed with a cylindrical portion $e^{43}$ having its end rounded off or formed as shown and which cylindrical portion $e^{43}$ is fitted into the central bore $e^{44}$ of said center $E^{16}$. During the operating process, said piercer or center $E^{15}$ with its shoulder at the small diameter of its tapered portion $e^{39}$ is pressing against the adjacent straight faced end of said center $E^{16}$ and, said centers $E^{15}$ and $E^{16}$ are so retained with each other during the operating process as shown. The forming-die $W^{14}$, the die-supporting roll $G^{14}$, and the edging and die-supporting roll $J^{61}$ have been moved and adjusted into the proper positions, as for instance shown in Fig. 8, and they are rotatably retained in said positions during the operating process. When thus positioned, the roll $G^{14}$ with its die-supporting portion $g^{139}$ is supporting the forming-die in both radial and lateral or axial directions and, with its edging or supporting portion $g^{137}$ it is against or in contact with the face finishing roll H as shown, and the roll $J^{61}$ with its die-supporting portion $j^{40}$ is supporting the forming-die in both radial and lateral or axial directions and, with its edging roll portion $j^{29}$ it is against or in contact with the face rolling roll K, as shown. Said die-supporting portion $j^{40}$ of said roll $J^{61}$, or the edging roll portion $j^{29}$ of said roll $J^{61}$ may be rotated or driven by its shaft J and the other part or parts of this roll may be made in a separate part or parts which are permitted to turn loose on a journal or journals provided on said roll $J^{61}$ or on its shaft J.

At the commencement of the process illustrated in Fig. 8, the face roll H is moved a certain radial distance away from the periphery of the forming-die $W^{14}$, as shown, and the face roll K is against or in contact with the peripheral edge of the forming-die $W^{14}$, as shown. The supporting head M with its axle E and piercer or center $E^{15}$ are moved, by the means before described, into the positions shown by the dotted lines. The work-piece F is then brought into the position shown and said parts M, E and $E^{15}$ are again moved, by the means before described, into the positions shown in Fig. 8, in which positions said parts M, E and $E^{15}$ are retained until the work-piece is ready to be dished. In these figures, the edging and web rolling roll $J^{69}$ is preferably formed as shown; that is, the part $j^{43}$ of said roll $J^{69}$ is the roll part adapted to roll or operate as shown upon the end face of the hub at one side of the work-piece and, the part $j^{28}$ of said roll $J^{69}$ is said web reducing roll part, (which may however have any other desirable or suitable form or shape than herein shown), operating against part of the end face of the hub, the peripheral face of the hub and adjacent web part, the web part, and the inner peripheral face of the rim of the work-piece at one side thereof. The part $j^{29}$ of said roll $J^{69}$ is the edging roll part operating upon and maintaining the lateral thickness of the rim and limiting therein the lateral flow of metal and operating against or in contact with the portion of the work-piece between said web reducing roll part $j^{28}$ of said roll $J^{69}$ and the periphery of the work-piece at its one side. While the work-piece is rotated by said roll $J^{69}$ and said forming-die $W^{14}$, which forming-die may be rotated by either or both of said rolls $J^{61}$, $G^{14}$, said roll $J^{69}$ is forced or rolled into the side of the work-piece and thus forces metal of the work-piece at its other side into the hub-forming cavity of said forming-die $W^{14}$ and around the portion $e^{39}$ of said piercer or center $E^{15}$, thus forming the hub at both sides of the work-piece, as shown in Fig. 9. During this action and while the work-piece is increasing in diameter, the face roll K is moving away from the periphery of the forming-die $W^{14}$ and metal of the work-piece is forced, by said roll $J^{69}$, over said inclined peripheral face $w^3$ of said forming-die $W^{14}$ and against the edging roll portion $j^{29}$ of said roll $J^{61}$, as shown in Fig. 9. The work-piece is thus rolled or formed to the form shown at F in Fig. 9. During the entire process the edging roll portion $j^{29}$ of roll $J^{69}$ is adapted to act against or in contact with the portion of the work-piece between the web rolling part $j^{28}$ of said roll $J^{69}$ and the periphery of the work-piece at one side thereof as shown and, the edging roll portion $j^{29}$ of roll $J^{61}$ is acting against or in contact with the other side of the marginal or rim portion of the work-piece, as shown.

Fig. 9 shows said work-piece F rotatably supported and so formed to the form shown, with its hub completely formed and with the outer end face of roll $J^{69}$ in contact with or against the peripheral face of said piercer or center $E^{15}$ and, with the roll $J^{69}$ forced into the work-piece at one side thereof and with one side of the work-piece against said forming-die $W^{14}$ as shown. With the parts thus positioned, the web portion of the work-piece may be reduced and formed to its desired thickness in a manner which is the same or similar to the manner as above described with reference to Figs. 5 and 6, that is:—Said roll $J^{69}$ may be moved during the web forming process longitudinally or substantially so from its position adjacent the hub portion, shown in Fig. 9, to the position of the roll $J^1$ adjacent the rim portion, shown for instance in Fig. 6, and during said longitudinal movement or movements of said roll $J^{69}$, the web reducing roll portion $j^{28}$ of said roll $J^{69}$ is also reducing the thickness of the web portion of the work-piece between the part $j^{28}$ of said roll $J^{69}$ and the forming-die $W^{14}$ to its desired thickness and is rolling or forming the inner peripheral face of the rim of the work-piece at one side thereof to the rudimentary form shown and forcing metal of the work-piece at its other side over said sufficiently inclined peripheral face $w^3$ of the forming-die $W^{14}$, thereby forming also the inner peripheral face of the work-piece at the other side thereof to the sufficiently inclined or rudimentary form shown, and as and for the purpose hereinbefore described with reference for instance to Figs. 48 and 49; or said roll $J^{69}$ when so forming said web portion to its desired thickness, may be moved longitudinally forward and backward as often as desired, while simultaneously with said longitudinal movements of said roll $J^{69}$ said face roll K is against or is operating against the peripheral face of the work-piece and rolls the same to the said beaked or rudimentary form, as shown for instance in Fig. 48. While the roll parts $j^{29}$, $j^{29}$ of said rolls $J^{69}$, $J^{61}$ are still operating in contact with the opposite side of the rim portion of the work-piece, said finishing rolls $G^1$ and H, shown at the other side of the axis of the work-piece, begin operating against the so rudimentarily formed rim portion, and roll with said roll $G^1$ the so rudimentarily rolled inner peripheral face of the rim of the work-piece at one side thereof to the finished form and roll with said roll H, the so beaked or rudimentarily formed peripheral face of the work-piece to the finished form shown at $F^2$ in Fig. 10. At the same time, the edging roll parts $j^{29}$, $j^{29}$ of said rolls $J^{69}$, $J^{61}$ are maintaining the lateral thickness of the rim to which the same has been rolled during the process. Simultaneously with the operations of said rolls $G^1$ and H against the work-piece and while the work-piece or wheel is rotating, the dishing may be done to dish the work-piece or wheel to the form $F^2$ shown in Fig. 10; which dishing may be done in the same manner as before described, for instance with reference to Figs. 1 and 2. The work-piece or wheel shown at $F^2$ in Fig. 10 is finished and may be removed by moving the rolls $J^{69}$, $G^1$, K and H into the positions shown for instance in Fig. 8 and by moving said supporting head M with its axle E and piercer or center $E^{15}$ into the position shown in dotted lines in Fig. 8. The work-piece or finished product taken out may be replaced by another work-piece &c.

It is further to be noted that during the entire forming and dishing operations, said piercer or center $E^{15}$, and the center $E^{16}$ are kept in line by said cylindrical end part $e^{43}$ of said piercer or center $E^{15}$ being held by said central hole $e^{44}$ of said center $E^{16}$, and while so connected with each other are also forced against each other, thereby forming one substantial supporting device which is absolutely required in cases where such long piercer or center is to be used.

A car wheel which is to be used, for instance, for light loads and light traffic only, may be formed as for instance described in the following with reference to Figs. 11 to 13 inclusive, in which I have for instance illustrated in brief, forming steps for completely forming and dishing the car wheel shown at $F^2$ in Fig. 13 from a blank or work-piece shown at F in Fig. 11, having for instance a conical or tapered central hole as shown. In these figures the forming-die $W^{19}$ is formed or shaped to conform to the center or hub part, the web part, the inner peripheral face of the rim portion, the lateral side of the rim of the finished car wheel at one side thereof before it is dished and said die also conforms to the peripheral face or flanged tread of the finished car wheel; the other side; that is, one side only, of the work-piece or wheel being rolled or formed by rolls as shown. In this process the metal in the peripheral face of the work-piece is not worked during the process, therefore the metal will be extended instead of being compressed, thereby producing incipient cracks in the tread or outer peripheral face of the rim, as hereinbefore referred to, but wheels thus produced with the use of this forming-die $W^{19}$ having the forming portion formed as shown in the Figs 11 to 13, may be used for light loads and light traffic only. The operating process in said Figs. 11 to 13 for forming and for dishing the wheel is the same or similar to the operating process before described with reference to Figs. 8 to 10 inclusive, with the exception that during the enlargement of the diameter of the work-piece during the operating process, the metal at the peripheral face of the work-piece is not worked and in this process the tread or face rolls K and H are not used to operate against the work-piece but they are used for supporting the forming-die $W^{19}$ at its peripheral face in both lateral and opposite radial directions; that is, the peripheral face of said forming-die at or near its ends is formed straight with a circumferential track or groove $w^6$ between said straight ends, and, the face roll K at its peripheral portion is correspondingly shaped with the tongue portion $K^{39}$ and straight-faced portions to fit said circumferential groove $w^6$ and said straight-faced peripheral end portions of the forming-die $W^{19}$. The face roll H at its peripheral portion is correspondingly shaped with the tongue portion $H^{91}$ and straight-faced portions to fit said groove $w^6$ and said straight-faced peripheral end portions of the forming-die $W^{19}$ as shown. The edging and die-supporting roll $J^{70}$ and die-supporting roll $G^{109}$ are in this case serving the only purpose to support the forming-die and are shown with stepped portions, each step-portion having its peripheral face formed straight, or approximately so, and the side of the forming-die next to said rolls $J^{70}$, $G^{109}$ is correspondingly shaped to fit said stepped portions of said rolls $J^{70}$, $G^{109}$, thereby supporting said forming-die $W^{19}$ in both lateral and opposite radial directions and, they may also be arranged so as to assist in rotating the forming-die $W^{19}$.

It is also to be observed that in this process, the edging roll portion $g^{137}$ of the roll $G^{55}$ as well as the edging roll portion $j^{29}$ of the roll $J^{69}$ is adapted to operate against the side of the rim of the work-piece or wheel and roll the same to its desired width as shown, and that, during the web reducing operation of the work-piece said roll $J^{69}$ may be moved longitudinally between the hub and rim portions of the work-piece, forward or backward, or forward and backward as often as desired.

In Fig. 14 the wheel shown at $F^2$ is formed and dished with the use of the same forming-die $W^{19}$, and the same rolls H, K, $J^{69}$ and $J^{70}$ shown in Figs. 11 to 13, but in this process the rolls $G^{55}$ and $G^{109}$ shown in Figs. 11 to 13 are not used. The wheel is formed with only the use of the rolls shown and it is formed and dished in a similar manner as described with reference to Figs. 11 to 13, except without the rolls $G^{55}$ and $G^{109}$.

In the Figs. 15 and 16, the work-piece F is similar to the work-piece F in the Figs. 8 and 11, and the axle E and piercer or center $E^{15}$ with the supporting head M and the axle E and the center $E^{16}$ with the supporting head $M^{50}$ are all the same and may be operated in the same manner as before described with reference to Figs. 8 to 13 inclusive, and the roll $J^{69}$ is the same and may be operated in the same manner as before described with reference to Figs. 8 to 14. The roll $G^1$ is the same and may be operated in the same manner as before described with reference to Figs. 4 to 10 and the roll $J^{74}$ is similarly formed and serves the same purpose as roll $J^{70}$ in Figs. 11 to 14. The roll $G^{110}$ is also similarly formed and serves the same purpose as roll $G^{109}$ in Figs. 11 to 13. In these Figs. 15 and 16, however, the forming-die $W^{20}$ is formed differently; that is, the circumference or periphery of the forming portion of this die $W^{20}$ reaches to a circle which has a diameter equivalent to that portion of the finished side of the rim of the work-piece or wheel where the rounding off of the outer circumferential corner of the tread commences and at this circle the forming-die $W^{20}$ is formed with a circular offset or shoulder $w^7$, and the tread or face finishing roll H has its peripheral or rolling face $H^1$ formed as shown with a circular flange $h^{17}$ provided with a fillet formed correspondingly with the rounded corner of said tread. When this face roll H is properly positioned at a certain radial distance from the axes of the piercer or center $E^{15}$, and the center $E^{16}$, the outer diameter of said flange $h^{17}$ is in contact with said shoulder $w^7$ of said forming-die $W^{20}$ as shown in Fig. 15. This one side of the rim of the work-piece or wheel is therefore formed by the forming-die, and the peripheral face of the work-piece or wheel including its flange and the rounding off of the outer corner of the tread of the rim is rolled to finish with said roll H, as shown. The face beaking or face rolling roll K has its peripheral or rolling face $K^7$ formed as shown and at its side next to forming-die $W^{20}$ said roll K is formed or provided with the circular portion or extension $K^{17}$ as shown. At the commencement of operation, the roll K with its rolling face $K^7$ is moved against the peripheral portion $w^5$ of said die $W^{20}$ as shown in Fig. 15. When the roll K is thus positioned the circular portion $K^{17}$ of said roll K may be in contact with or be somewhat away from the shoulder $w^7$ of said die $W^{20}$, as shown in Fig. 15, thereby, during the operating process and while said roll K moves from the position thereof shown in Fig. 15 to the position thereof shown in Fig. 16, the one side of said roll K will be fully supported by said forming-die $W^{20}$, as shown. At the same time, the other side of said roll K will be against or in contact with the edging roll portion $j^{29}$ of said roll $J^{69}$ and thus one side of the rim portion of the work-piece or wheel is being formed by said forming-die while the other side of said rim portion is being rolled to the desired width of said rim portion by the edging roll portion $j^{29}$ of said roll $J^{69}$, as shown in Fig. 16. In this process, said face roll H is positioned at the proper radial distance from the axis of said piercer or center $E^{15}$ and said center $E^{16}$ to suit the finished radius of the finished wheel and it is retained in said position during the forming and dishing operations. Otherwise the operating process or steps is similar to the operating process or steps before described with reference to Figs. 8 to 10.

A car wheel or other circular article may also be formed as for instance described in the following with reference to the Figs. 17 to 20, in which the roll $J^{69}$ may be the same and may be operated the same or similar to the roll $J^{69}$ described with reference to Figs. 8 to 10 and Figs. 15 and 16, and the roll $J^{61}$ may be the same and may be operated the same or similar to the roll $J^{61}$ described with reference to Figs. 4 to 10 inclusive, and the roll $G^1$ may be the same and may be operated the same or similar to the roll $G^1$ described for instance with reference to Figs. 4 to 10 and Figs. 15 and 16 and the roll $G^{14}$ may be the same and may be operated the same or similar to the roll $G^{14}$ described for instance with reference to Figs. 4 to 10. In these Figs. 17 to 20 inclusive, I have illustrated in brief, a forming operation or steps, according to my invention, such as I prefer to employ for completely forming and dishing the car wheel shown at $F^2$ in Fig. 20, including the rolling of the entire end face of the hub of the work-piece at one side thereof and the piercing or penetrating or centering of the properly heated work-piece, from a blank or work-piece, such as shown at F, in Fig. 17, in which figure the work-piece F and the forming-die $W^{12}$ are shown in diametral section and the work-piece may have a thickness which is either the same or greater, or less than the length which the hub of the car wheel is to have when rolled or formed to finish.

Fig. 17 shows said work-piece F brought into the position shown, wherein the outer portion or periphery of the work-piece is coaxial, or approximately so, with the piercers or centers $E^1$, $E^9$ and central with the forming-die $W^{12}$. In this case, said piercers or centers are formed as shown and the lengths of their penetrating portions $e^{39}$, $e^{39}$ are made to suit the location of the web portion of the car wheel as shown; that is, the web portion of the wheel in this case will be formed in the center of the length of the hub of the wheel and said penetrating portions of said piercers or centers $E^1$, $E^9$ will have both the same length, which may reach to or near the center of the thickness of the finished web adjacent the hub portion of the wheel, as shown in Fig. 17. The forming-die $W^{12}$ is formed or shaped at its forming-side to conform to the center or hub part, the web part, and the inner peripheral face of the rim of the finished car wheel at one side thereof before being dished, as shown. At its other side next to the rolls $G^{14}$, $G^{61}$ this forming-die is formed with a central hub having a bore of two diameters so as to form a shoulder and is formed with a circular track or groove $w^4$ as shown. The axle E of the supporting head $M^{50}$ is provided with the piercer or center $E^9$ which is formed with a cylindrical portion $e^{38}$ and an enlarged cylindrical portion or flange $e^{37}$ and at its outer end adjacent the work-piece it is provided with the piercing or penetrating or forming portion $e^{39}$. The portions $e^{37}$, $e^{38}$ of said piercer or center $E^9$ are slidably fitted in the bore of the hub of said forming-die $W^{12}$, thus supporting said forming-die. The axle E of the supporting head M is provided with a piercer or center $E^1$. This piercer or center $E^1$ is formed adjacent its piercing or penetrating or centering part $e^{39}$ with an extension $e^{42}$ having a straight or approximately straight peripheral face, the diameter at the adjoining portions of said extension and said piercing or penetrating or centering part being the same or substantially the same. The peripheral face of the extension $e^{42}$ of said piercer or center $E^1$ is formed cylindrical or slightly conical so as to permit the end face of the roll $J^{69}$ to properly come against or in contact therewith during the operating process for rolling of forming the hub as shown in Figs. 17 and 18. The forming-die $W^{12}$, the die-supporting roll $G^{14}$, and the edging and die-supporting roll $J^{61}$ have been moved and adjusted, by the means before described, into the proper positions shown in Fig. 17 and therein they are rotatably retained during the operating process. When thus positioned, the roll $G^{14}$ with its die-supporting portion $g^{139}$ is supporting the forming-die $W^{12}$ in both radial and lateral or axial directions and with its edging or supporting portion $g^{137}$ it is against or in contact with the face finishing roll H, as shown; the roll $J^{61}$ with its die-supporting portion $j^{40}$ is supporting the forming-die $W^{12}$ in both radial and lateral or axial directions and with its edging roll portion $j^{29}$ it is against or in contact with the face rolling roll K as shown. The die-supporting portion $j^{40}$ of said roll $J^{61}$, or the edging roll portion $j^{29}$ of said roll $J^{61}$ may be rotated or driven by its shaft J and the other part or parts of this roll may be made in a separate part or parts which are permitted to turn loose on a journal or journals provided on said roll $J^{61}$ or on its shaft J.

At the commencement of the process or steps illustrated in Fig. 17, the face roll H is moved to a certain radial distance away from the periphery of the forming-die $W^{12}$, as shown; the face roll K is against or in contact with the peripheral edge of the forming-die $W^{12}$, as shown; and the work-piece F is brought into the position shown. The piercer or center $E^9$ is retained in the position shown in Fig. 17 until the work-piece or wheel is ready to be dished. In this operating process, the edging and web rolling roll $J^{69}$ is preferably formed as shown; that is, the peripheral or operating face of the roll part $j^{43}$ of said roll $J^{69}$ is formed substantially straight as shown and is the roll part adapted to roll or operate, as shown, upon the end face of the hub of the work-piece at one side thereof during the forming process of forming the hub of the work-piece. The part $j^{28}$ of said roll $J^{69}$ is the web reducing roll part, which may however have any other desirable or suitable forms or shapes than herein shown, operating as shown alternately against the hub and adjacent web part, the web part, and the inner peripheral face of the marginal or rim portion of the work-piece or wheel at one side thereof; that is, the web reducing roll part $j^{28}$ of said roll $J^{69}$ is operating with its outer rolling or operating portion upon the web and the hub parts of the work-piece at one side thereof and is forcing metal of the work-piece at its other side into the hub-forming cavity of said forming-die $W^{12}$ and around the penetrating or forming portion $e^{39}$ of said piercer or center $E^9$, thereby forming or shaping the hub at both sides of the workpiece as shown in Fig. 18. While the workpiece is increasing in diameter during the hub forming process and while the face roll K is moving away from the periphery of the forming-die $W^{12}$, metal of the work-piece is forced by said roll $J^{69}$ over the inclined peripheral face $w^3$ of said forming-die and against the edging roll portion $j^{29}$ of said roll $J^{61}$. During the web forming process, the inner or operating portion of the part $j^{28}$ of said roll $J^{69}$ is operating on the web part and the inner peripheral face of the rim of the work-piece at one side thereof and rolls or forms said inner peripheral face of said rim at one side of the work-piece to rudimentary form and sufficiently inclined toward the periphery of the work-piece as shown and also forces metal of the work-piece, at its other side, over said sufficiently inclined peripheral face $w^3$ of the forming-die $W^{12}$, thereby forming also the inner peripheral face of the work-piece at the other side thereof sufficiently inclined toward the periphery of the work-piece, as shown. The peripheral or operating face of the edging roll parts $j^{29}$, $j^{29}$ of said rolls $J^{69}$, $J^{61}$ are formed substantially straight, as shown, and during the operating process come in contact with or against the opposite sides of the tread or face roll K, as shown. This edging roll part $j^{29}$ of roll $J^{69}$ is adapted to roll or limit the lateral flow of metal in the portion of the work-piece between the roll part $j^{28}$ of said roll $J^{69}$ and the periphery of the work-piece; or such rolls, as for instance $J^{69}$, may not have such web reducing roll part $j^{28}$, but be for instance wholly formed conical, as for instance shown and described in my said original application.

Fig. 18 shows the hub portion of the work-piece so formed as above described and with the edging roll portion $j^{29}$, $j^{29}$ of the rolls $J^{69}$, $J^{61}$ against or in contact with the opposite sides of the face roll K; the lateral width or thickness of said face roll K is the same as the lateral width which the marginal or rim portion of the work-piece or wheel is to have when rolled or formed to finish, as shown in Figs. 18, 19 and 20. With the roll $J^{69}$ thus positioned, as shown in solid lines in Fig. 18 and in dotted lines in Fig. 19, and with the work-piece with its one side against the forming-die $W^{12}$, as shown, the web portion of the work-piece may be reduced or formed to the desired thickness in a manner which may be the same or similar to the manner for instance before described with reference for instance to Figs. 5 and 6, that is: Said roll $J^{69}$ may be moved during the web forming process longitudinally or substantially so from its position adjacent the hub portion, shown in solid lines in Fig. 18 and in dotted lines in Fig. 19, to the position of said roll $J^{69}$ adjacent the rim portion, shown in Fig. 19, and during the longitudinal movement or movements of said roll $J^{69}$, the web reducing roll portion $j^{28}$ of said roll $J^{69}$ is also reducing the thickness of the web portion of the work-piece between the part $j^{28}$ of said roll $J^{69}$ and the forming-die $W^{12}$ to its desired thickness and is forming the inner peripheral face of the rim of the work-piece at one side thereof to the said rudimentary form and it is also forcing metal of the work-piece at its other side over said sufficiently inclined peripheral face $w^3$ of the forming-die $W^{12}$, thereby forming also the inner peripheral face of the work-piece at the other side thereof to the sufficiently inclined form shown, and as and for the purpose before described with reference for instance to Figs. 48 and 49; or said roll $J^{69}$ when forming or reducing said web portion to its desired thickness, may be moved longitudinally forward or backward, or forward and backward as often as desired, while simultaneously with said longitudinal movements of said roll $J^{69}$ said face roll K is against or is operating against the peripheral face of the work-piece and rolls the same to the said beaked or rudimentary form, as and for the purpose shown and described for instance with reference to Fig. 48. While the edging roll parts $j^{29}$, $j^{29}$ of said rolls $J^{69}$, $J^{61}$ are still operating in contact with the opposite sides of the rim portion of the work-piece, said finishing rolls $G^1$ and H, shown at the other side of the axis of the work-piece, begin operating against the so rudimentarily formed rim portion and roll with said roll $G^1$ the so rudimentarily rolled inner peripheral face of the rim of the work-piece at one side thereof to the finished form while said roll H rolls the so beaked or rudimentarily formed peripheral face of the work-piece to the finished form shown at $F^2$ in Fig. 20. At the same time, the edging roll parts $j^{29}$, $j^{29}$ of said rolls $J^{69}$, $J^{61}$ are maintaining the lateral thickness of the rim to which the same has been rolled during the process. Simultaneously with the operations of said rolls $G^1$ and H against the work-piece and while the work-piece or wheel is rotating, the dishing may be done to dish the work-piece or wheel to the form $F^2$ shown in Fig. 20 which dishing may be done in the same manner as before described, for instance with reference to Figs. 1 and 2 and other figures. The work-piece or wheel shown at $F^2$ in Fig. 20 is thus finished and may be taken out and replaced by another work-piece, &c. Said dishing may also be done in the manner before described.

A car wheel or other circular article may also be formed as for instance illustrated in the Figs. 32 and 33 in which I have shown a car wheel or similar body formed from a solid circular blank shown at F in Fig. 32. The piercing or penetrating or centering process is similar to the process before described for instance with reference to Figs. 17 and 18, with the exception that in this case the piercer or center, for instance $E^6$ of the supporting head M, is provided with the flange or shoulder $e^{30}$, as shown; all other parts are similar to the corresponding parts shown in Figs. 17 to 20, with the exception that in this case the edging and die-supporting roll $J^{59}$ is formed somewhat different, and the hub end-face rolling portion $j^{43}$ of the roll $J^{69}$ is omitted in the roll $J^1$ shown in Fig. 32 and in place of said hub end-face rolling portion $j^{43}$ the piercer or center $E^6$ is provided with said flange or shoulder $e^{30}$, which may serve the same purpose as said portion $j^{43}$. Otherwise the operation or steps illustrated in Figs. 32 and 33 may be the same or similar to the operation or steps for instance described with reference to Figs. 17 to 20 inclusive. Fig. 32 shows the work-piece and the operating parts at or before commencement of operation. Fig. 33 shows the work-piece and the operating parts at the end of the forming and dishing operation. The dishing or dishing and rolling will be done in a similar manner as hereinbefore described.

In Figs. 34 to 37 inclusive, I have for instance illustrated in brief, a forming process or steps according to my invention, such as I prefer to employ for completely forming the undished car wheel hereinbefore referred to and for instance shown at $F^2$ in Fig. 30, or a car wheel similar thereto, including the piercing or centering of the properly heated work-piece. In Fig. 34 the work-piece is shown formed to the form shown at F with its hub completely formed as hereinbefore described and therein is shown the edging roll parts $j^{29}$, $j^{29}$ of the rolls $J^7$, $J^{59}$ against or in contact with the opposite sides of the face roll K which has a lateral width which is the same as the lateral width which the marginal or rim portion of the work-piece or wheel is to have when finished. In said Figs. 34 to 37 inclusive, said car wheel has its web formed in undished position; that is, at right angles, or approximately so, with the axis of the wheel, but the hub of this wheel is not formed central to the web, but it is formed into the position required of a dished wheel; that is, the hub is in the same position as for instance the hub in Fig. 29 or 42. The piercing or penetrating or forming portion of the piercers or centers $E^6$, $E^{10}$, in this case, are formed of uneven lengths, that is, they may reach to or near the center of the thickness of the web adjacent the hub of the work-piece or wheel, as shown. The piercing or penetrating or centering process is similar to the process before described for instance with reference to Figs. 17 and 18, with the exception that in this process the piercer or center used, for instance $E^6$, of the supporting head M, is provided with the flange or shoulder $e^{30}$ as shown. The work-piece F in said Fig. 34 is forced with one side against the forming portion of the forming-die $W^8$, which die is slidably mounted on the piercer or center $E^{10}$ of the axle E of the supporting head $M^{50}$. The work-piece is thus rotatably supported at its center or hub portion by both said piercers or centers $E^6$, $E^{10}$, and the forming-die $W^8$ and the work-piece are rotating with each other. When so supported, the work-piece may also be automatically and firmly clamped between said piercers or centers $E^6$, $E^{10}$, as and for the purpose hereinbefore described, and be so retained during the entire rolling or operating process until the finished rolled or formed wheel is ready to be removed.

With the work-piece F and the operating parts in the positions shown in Fig. 34, with the end face of the edging and web rolling roll $J^7$ against or in contact with the flange or shoulder $e^{30}$ of said piercer or center $E^6$, and with the roll $J^7$ thus positioned, the web portion of the work-piece F may be reduced, or formed to its desired thickness in either of the following manner, forming part of this forming process or steps: For instance, said roll $J^7$ may either be moved longitudinally or approximately so, during the web forming process from its position adjacent the hub portion shown in Fig. 34, to the position adjacent the rim portion shown in Fig. 36, or said roll $J^7$ may be so moved, during said web forming process, between said hub and rim portions forward or backward, or forward and backward as often as desired and, during said longitudinal movement or movements of said roll $J^7$, the web reducing roll part $j^{28}$ thereof is reducing or forming the web portion of the work-piece between the part $j^{28}$ of said roll $J^7$ and the forming-die $W^8$ to its desired thickness and is forming the inner peripheral face of the rim of the work-piece at one side thereof to the rudimentary form shown in Fig. 36 and as and for the purpose hereinbefore set forth with reference for instance to the Figs. 48 and 49, and during said web forming process said roll $J^7$ is also forcing metal of the work-piece at its other side over said sufficiently inclined face $w^3$ of the forming-die $W^8$, thereby forming the inner peripheral face of the work-piece at its other side thereof to the sufficiently inclined or rudimentary form shown in Fig. 36, and as and for the purpose hereinbefore described with reference to Figs. 48 and 49. During this action and while the work-piece is increasing in diameter, as indicated for instance in Figs. 34 and 36, the face roll K is moving outward to conform to the increasing diameter while said face roll is continually operating against the peripheral face of the work-piece, and while metal of the work-piece is forced, by said roll $J^7$, over the inclined peripheral face $w^3$ of said forming-die $W^8$ and against the edging roll portion $j^{29}$ of said roll $J^{59}$, as shown in Fig. 36. The work-piece is thus formed to the form shown at $F^1$ in Fig. 36. During the entire process, the edging roll portion $j^{29}$ of the roll $J^7$ is adapted to act against or in contact with the portion of the work-piece between the web rolling portion $j^{28}$ of said roll $J^7$ and the periphery of the work-piece at one side thereof, as shown, and the edging roll portion $j^{29}$ of roll $J^{59}$ is acting against or in contact with the other side of the marginal or rim portion of the work-piece as shown. Simultaneously with said longitudinal movement or movements of said roll $J^7$, said face roll K is also beginning or is operating against the peripheral face of the work-piece and rolls the same to the beaked or rudimentary form shown in Fig. 36 and as and for the purpose hereinbefore described with reference to Figs. 48 and 49; or, instead of said longitudinal movement of said roll $J^7$ from its position adjacent the hub portion to the position adjacent the rim portion, said roll $J^7$ may be moved longitudinally, or approximately so, forward and backward as often as desired while simultaneously with said longitudinal movements of said roll $J^7$, said face roll K is against or is operating against the peripheral face of the work-piece and rolls the same to the said beaked or rudimentary form, as shown in Fig. 36. While the roll parts $j^{29}$, $j^{29}$ of said rolls $J^7$, $J^{59}$ are still operating in contact with the lateral sides of the marginal or rim portion, said finishing roll $G^7$ shown at the other side of the axis of the work-piece is then moved laterally from its position shown in Fig. 36 to the position thereof shown in Fig. 37 and, during its said lateral movement, it is rolling the so rudimentarily formed inner peripheral face of the rim of the work-piece at one side thereof to the finished form. Simultaneously with the operation of said roll $G^7$ against the workpiece at one side thereof, the face finishing roll H begins operating against the so beaked or rudimentarily formed peripheral face of the work-piece and rolls the same to the finished form shown at $F^2$ in Fig. 37, while the edging roll parts $j^{29}$, $j^{29}$ of said rolls $J^7$, $J^{59}$ are maintaining the lateral thickness of the rim to which the same has been rolled during the process, thus finishing the wheel to the form $F^2$ shown in Fig. 37. Or, if desired, said roll $J^7$ may, for instance be retained in its position adjacent the hub portion of the work-piece F shown in Fig. 34 and the web and the inner circumferential face of the rim of the work-piece at one side thereof, and the so beaked rudimentarily formed peripheral face of said rim portion of the work-piece may be rolled or formed with the rolls $G^7$, H and the forming-die $W^8$ by moving the roll $G^7$ from its position shown in Fig. 34 to the position thereof shown in Fig. 35 and, during said lateral movement said roll $G^7$ is reducing or rolling or forming the unfinished portion of the web of the work-piece to its desired thickness and the inner peripheral face of the rim of the work-piece at one side thereof to the finished form shown, while simultaneously with the operation of said roll $G^7$ against the work-piece, said finishing roll H may be in contact with or begin operation against the so beaked or rudimentarily formed peripheral face of the work-piece and roll the same to the finished form shown at $F^2$ in Fig. 35, while the roll parts $j^{29}$, $j^{29}$ of said rolls $J^7$, $J^{59}$ are maintaining the lateral thickness or width of the rim to which the same has been rolled during the process, thus having finished the wheel to the form $F^2$ shown in Fig. 35 or Fig. 37. In this manner the wheel is formed perfectly true and smooth, to balance, and to gage or gages. Any surplus of metal in the work-piece or car wheel may be forced, during the forming process, to flow either into the inner rim and adjacent web portion, that is to say, into the space indicated by $f^{15}$ in Fig. 37, or it may be forced into any other portion or portions of the work-piece, wheel or other object without leaving a raised undesirable circular portion or fin anywhere on the finished wheel.

Figs. 38 and 39 illustrate a dished gear blank, or a dished disk-wheel, or a center such as for instance used in some tired car wheels. In these figures the peripheral rolling or operating face $K^3$ of the face rolling roll K is formed straight, and the peripheral rolling or operating face $H^2$ of the face finishing roll H is also formed straight. These face rolls K and H may be connected together by means of equalizing mechanism and when so connected may be disconnected from said equalizing mechanism without disconnecting said rolls from their power or pressure means; that is to say, said face rolls K and H may be operated against the peripheral face of the work-piece either together, in unison, or independent of each other. In Fig. 38 the work-piece has been formed, including its web portion, to the form shown at $F^1$, in a similar manner as hereinbefore described and, with the operating parts shown in the positions at beginning of the dishing or dishing and rolling operations. In Fig. 39 the work-piece has been dished or dished and rolled to the form shown at F² in a similar manner as hereinbefore described and, with the operating parts shown in the positions at the end of the finishing and dishing operations.

In Figs. 40 and 41 is illustrated, for instance, a new or worn car wheel rolled, for instance, smaller in diameter. In this case the actual forming portion of the preferred forming-die reaches to the inner peripheral face of the rim of the car wheel at one side thereof when rolled or formed to its desired finished smaller diameter and it is shaped to conform to the dished web portion, the center or hub part and the inner peripheral or inner circumferential face of the rim portion of the car wheel at one side thereof when rolled or formed to its desired finished smaller diameter. The piercing or penetrating or forming portion $w^1$ is formed integral with the forming-die $w^3$ as shown. Fig. 40 shows the work-piece F¹ placed onto the forming-die W³ and the operating parts in the positions they assume at the beginning of operation against the rim portion of the work-piece F¹, and it also shows the center $w^1$ of the forming-die W³ and the center E² of the axle E of the supporting head M forced or entered loosely into the central hole and over the peripheral face of the hub portion of the work-piece F¹; that is, the center $w^1$ of the forming-die is either forced or entered loosely into the bore and at the same time the peripheral face of the hub of the work-piece at the side next to the forming-die is forced into the hub-forming cavity of the forming-die, and the center part $e^{36}$ of the center E² is either forced or entered loosely into the bore while the flange part $e^{35}$ thereof which surrounds said center part $e^{36}$ and is formed integral with said center E² is forced over the peripheral face of the hub portion of the work-piece at the other side thereof, thus making the hole in the work-piece, or a part or parts thereof, either larger or smaller in diameter so the wheel when finished may be rebored to its original diameter or to a larger diameter. The space or distance between the inclined peripheral face $w^5$ of the forming-die W³ and the inner peripheral face of the rim of the work-piece at one side thereof, indicated by $f^{25}$, will be filled up with metal of the rim and adjacent web portion during this process, as shown in Fig. 41. In this case, the rolling or operating part K¹ of the face roll K is shown formed to conform with peripheral face of the wheel when finished, with the exception that the outer corners of the tread and flange are not rounded with this roll K, but such rounding will be performed by the rolling or operating part H¹ of the face roll H, as shown in Figs. 40, 41 and also illustrated in Figs. 50 and 51. Said face rolls K and H may also be operated against the peripheral face of the work-piece, either together in unison, or independent of each other. In this case, said face rolls K and H are shown to be operated together in unison against the peripheral face of the work-piece; that is, each roll moves the same radial distance as the other. These face rolls K and H, in this case, are forced against the peripheral face of the work-piece at diametrically opposite points while the work-piece is rotating and thereby compress and enlarge the sectional area of the metal in the rim portion of new or worn wheels while the same are rolled to smaller diameter, and thus form the rim of the wheel to smaller diameter. Fig. 41 shows said new or worn car wheel, shown at F¹ in Fig. 40, so rolled or formed to the form shown at F², and shows the work-piece or wheel and the operating parts in their positions at the end of the rolling or operating process.

By such forming processes or steps, as for instance herein described for completely forming and dishing car wheels or other bodies embodying my invention including said piercing or centering of the work-piece with my said preferred apparatus or mill, or with any other mill producing the same result, the blank or work-piece may be pierced or centered and completely formed in the same apparatus or mill with one heat to, for instance, the completely formed car wheel F² shown for instance in the Figs. 29, 30, or 31, in which figures the wheel is shown with its hub bored. When the car wheel is so completely formed the flat end faces of the hub extensions or flanges 7, 7 are faced and the hub may be bored to proper size as shown at 6, Figs. 57 and 58.

The advantages of my invention are many and will be appreciated by those skilled in the art. Some of said advantages are for instance:—

The production of a car wheel embodying my invention, having its central or hub and web portions including the inner edge, or the inner peripheral face or faces of its rim or marginal portion die and roll forged and its rim or marginal portion with the exception of the inner peripheral edge or inner peripheral face at the side next to the forming-die roll-forged and having the metal in the flange, tread and whole rim portion worked to greater density or refinement than the metal in the central or hub and web portions, with the greatest degree of density in the metal of the tread, flange and root of the flange where the strength of the wheel and its resistance to wear is mostly needed, which gives to said parts the greatest possible strength and most efficient wearing surface, which results in a car wheel much stronger and of longer actual life or service than has heretofore been produced. A car wheel or other circular object thus formed results also in an enormous saving in the cost of operations during manufacture and the product is also cheapened and the output increased; or for instance, the production of a car wheel, as herein described, wherein metal has been worked from the rim portion onto the undished web portion during the forming and dishing of the car wheel to make up the extra length required in the dished web, results in a wheel which is free or substantially free from initial or inherent stresses or strains which would tend to distort the wheel if subject to strain or to heat; or for instance, the production of a car wheel having an annular extension formed at one or both ends of the hub, whereby, when turning or facing one or both ends of the hub to required length or gage, considerable time is saved, as well as tools and gives the product an individuality by means of which it may be distinguished from other articles of the same class; or for instance, the production of a partly die and roll-forged and partly roll-forged car wheel, free or substantially free from initial or inherent stresses or strains; or for instance, the production of a partly die and roll-forged and partly roll-forged car wheel having the metal therein worked to varied density in circular regions; or for instance, the production of a partly die and roll-forged and partly roll-forged car wheel worked or formed smooth on all its surfaces and free from undesirable raised portions or fins; or for instance, the production of a completely forged car wheel being partly die and roll-forged and partly roll-forged and being formed integral and worked or formed smooth on all its surfaces with one heat; or for instance, the production of a car wheel partly die and roll-forged and partly roll-forged with its hub punched or pierced, all performed with one heat; or for instance, the production of a partly die and roll-forged and partly roll-forged wheel which has been formed to rudimentary form and then to finished form; or for instance, the production of a rudimentarily formed car wheel being partly die and roll-forged and partly roll-forged and having the rim or peripheral portion formed to rudimentary form, so that the metal in said rim portion has been condensed or compressed to uniform or to practically uniform density; or for instance, the production of a partly die and roll-forged and partly roll-forged car wheel having its hub, web and the inner peripheral face or faces of its rim formed by die and roll-forging and the remaining portion of its rim, including its outer peripheral face, formed solely by rolling pressures and evidencing said rolling and forming of the car wheel throughout; or for instance, a wheel partly formed with a forming-die slidably supported on suitable supporting means, the actual forming side or forming portion of said forming-die being shaped to conform to the form or shape of that portion of the car wheel or other body at one side thereof which reaches to a circle at the inner peripheral edge or inner peripheral face of the marginal or rim portion of the wheel or other body when the same is rolled and formed to its finish; that is, the side of the work-piece next to the forming-die is pressed against the forming-die and metal of the work-piece at the side thereof next to the forming-die is forced into the forming cavity or cavities of the forming-die inside of said circle by the action of a roll or rolls acting against the work-piece at the other side thereof, and, the metal worked by and between said die and roll or rolls is "die and roll-formed" or "die and roll-forged" because one side thereof is being "rolled" or "roll-forged" or "rolled to form" while the other side is being "die-formed". By this means, all surfaces of the work-piece or wheel, with the exception of that portion of the work-piece or wheel at one side thereof inside of said circle, are acted upon directly by rolls, and the whole rim portion, with the exception of the inner peripheral face of the rim portion next to the forming-die, is rolled direct by rolls, and as soon as the metal at the peripheral face of the work-piece reaches the peripheral rolling face of the face roll K (see for instance Figs. 17 and 18), it will be rolled or worked continually until the work-piece or wheel has been rolled and formed to a desired diameter with the outer peripheral face thereof rolled for instance to the beaked or rudimentary form as for instance shown in Fig. 19. When thus rolled, the finishing roll H operates against the peripheral face of the work-piece or wheel, whereby the metal in the whole rim portion of the work-piece or wheel is compressed or worked to its maximum and uniform density or practically so; or for instance, in forming, for instance, such articles as car wheels embodying my invention, the metal in the flange, tread and whole rim portion of the article may be worked to maximum density where the strength of the wheel is mostly needed, thereby giving to said parts the greatest possible strength and most efficient wearing surface, thus enormously reducing the cost of operation in the manufacture or the making of car wheels or other circular articles, cheapening the product and increasing the output; or for instance, the forming of the inner peripheral faces of the marginal or rim portion of a work-piece or wheel sufficiently conical, or sufficiently inclined, as and for the purpose hereinbefore described, for instance with reference to Figs. 48, 49, 51 and 52, and then rolling the metal, or part of the metal forming the so sufficiently conically rolled inner peripheral face of the said marginal or rim portion of the work-piece or wheel at one side thereof into another portion of the work-piece or wheel, as and for the purpose hereinbefore described and diagrammatically illustrated in Figs. 48 and 49. Other advantages are, for instance, the rolling of the total peripheral face of the work-piece or wheel, first to beaked or rudimentary form, as and for the purpose hereinbefore described with reference, for instance, to Figs. 19, 53, 54, 55, 56, 48 and 49 and then rolling the so beaked rudimentarily formed peripheral face to desired finished form, as and for the purpose hereinbefore described, for instance, with reference to Figs. 20, 53, 54, 55, and 56 and diagrammatically illustrated in Figs. 48 and 49; or for instance, car wheels or other circular bodies will be formed perfectly true, smooth and to balance and to the desired gage or gages, and when the tread and flange or peripheral face of the car wheel or other circular body being rolled reaches its desired finished diameter, said finished diameter will automatically be retained during any further rolling or operating against the car wheel or other body; or for instance, the use of the tread or face roll K having its peripheral or rolling face formed as and for the purpose hereinbefore described with reference to the Figs. 19, 53, 54, 55, 56, 48, 49 or Figs. 51 and 52 and having its lateral thickness or width the same as is the lateral thickness or width which the outer or rim portion of the car wheel or other article is to have when finished and, the use of such edging and web rolling roll, formed for instance as $J^1$, $J^7$ or $J^{69}$, &c., and the edging and die-supporting roll, formed for instance as $J^{59}$, $J^{60}$ or $J^{61}$, &c., being formed as and for the purpose hereinbefore described, for instance with reference to the Figs. 48, 49, 51 and 52 and as, for instance, shown in the Figs. 19, 20 &c., whereby with said roll K and with said edging and web rolling roll and said edging and die-supporting roll formed as for instance herein shown and as and for the purpose hereinbefore described, the metal in the peripheral face and in the whole rim portion of a car wheel or other article embodying my invention is also worked continually during the rolling process upon all its surfaces simultaneously with the forming-die and said three rolls formed for instance as herein shown and thereby, the metal in the peripheral face and the whole rim portion of a car wheel or other article is also condensed uniformly to its maximum, or practically so, thus giving to said metal in said peripheral face and rim portion its due maximum and uniform strength and its due maximum and uniform resistance to wear and thereby, when the work-piece or wheel is finished by my finishing processes, said peripheral face and the whole rim portion is also formed smooth on all its surfaces to the desired forms or shapes without leaving a raised circular portion or fin which would have to be removed afterward by turning, or other costly means; or for instance, my preferred forming-die herein shown and described in some of its various forms is slidably supported on the piercer or center of, for instance, the supporting head $M^{50}$ and rotatable with said piercer or center, whereby with the use of the herein named piercer or center, the forming-die and the various shaped rolls, the work-piece or wheel is first formed to undished form and with said piercer or center of supporting head $M^{50}$, the work-piece or wheel is dished while said forming-die together with the edging and die-supporting roll and both the face rolls H and K are rotatably retained in their positions, as for instance shown in Figs. 19 and 20 and as hereinbefore fully shown and described. Other advantages of my invention will appear from the matter hereinbefore shown and described.

Where in the specification and claims the word "coaxial" or "coaxially" is used with reference to the centering, or piercing or penetrating and centering, and to the positioning of a work-piece, &c, it is intended to mean "coaxial or approximately coaxial" &c.

Where in the specification and claims the words "ingot, bloom or blank" are used, it is intended to mean the work-piece to be operated upon, and the word "work-piece" is used herein in a broad sense and it is intended to include an ingot, bloom, blank, car wheel or any other unfinished or completely finished circular, or approximately circular object adapted to be rolled or formed, reworked or re-formed, either to entirely change its shape, or only partly change its shape or outline, or to change its dimensions in whole or part, as desired. In other words "work-piece" means any circular, or approximately circular, object to be operated upon.

Where in the claims reference is made to a car wheel or similar article, &c., or any portion of a car wheel, or to the metal in the car wheel or any portion thereof, or matter of like import, it is intended to refer to a car wheel before it is put in service; it being, of course, understood that after a car wheel is applied to a car and supports the weight of the car body, it is subjected to strains.

Where in the specification and claims the words "sufficiently conical" or "sufficiently inclined" are used with reference to the said inner rolling or operating portion of the web reducing roll part $j^{28}$ of said edging and web rolling roll, for instance $J^1$, $J^7$ or $J^{69}$ &c., and to the inclined peripheral portion, for instance $w^3$ of the forming-die, for instance $W^3$ in Fig. 34, or with reference to the inner peripheral face or faces of the marginal or rim portion of a work-piece or wheel or other object, it is intended to mean the inclination of said inner rolling or operating portion of said web reducing roll part $j^{28}$ and the inclination of the peripheral portion, for instance $w^3$ of the forming-die, for instance $W^s$ in Fig. 34, being formed &c., so as to cause the metal in said rim portion, during the operating process, to flow in the proper directions to assure compression of the metal in said rim portion to uniform or to practically uniform density, as distinctly illustrated in Figs. 48, 51 and 52, and as hereinbefore fully described with reference to said Figs. 48, 51 and 52. The reference characters 4 and 5, in Figs. 57 and 58, designate the web and hub portions or the central portion of the wheel or other article, which may also be termed the body portion of the wheel or other article.

The foregoing description clearly sets forth various piercing or penetrating or centering and rolling, forming, or forging processes or steps and operations, which I prefer to employ for piercing or penetrating and completely rolling and forming or forging and dishing, or working or re-working or re-forming properly heated ingots, blooms, blanks or other work-pieces into completely finished car wheels or other circular bodies embodying my invention, in the same apparatus or mill.

The method of an apparatus or mill I prefer to employ for producing car wheels or other circular articles embodying my invention forms no part of this invention, this being claimed in my said application filed October 9, 1917, Serial No. 195,637 and in my said applications having the hereinbefore mentioned serial numbers and filing dates.

The foregoing description and accompanying drawings further fully set forth my invention, together with portions of an apparatus or mill for manufacturing the same, and also illustrate and describe modifications in the arrangement and constructions of said portions. It is to be understood, however, that many modifications and changes in the construction and arrangement of the parts and also in the steps and operation may still be made without departing from my invention, as defined in the claims.

My said novel devices or means herein described, may be operated in many ways different from those herein described and still be within the scope of my invention, and it is to be understood that I do not desire to limit myself to the operations of said devices or means as herein described, as such are only a few examples for the purpose of illustrating the manner or way of operating the same in forming car wheels or other circular articles embodying my invention herein described.

Certain features of my invention herein described are not all claimed herein, but such features not herein claimed are covered by claims within applications filed by me and within patents issued to me and having the hereinbefore mentioned filing dates, serial numbers and patent numbers.

It will be obvious to those skilled in the art that changes may be made without departing from my invention as defined in the claims.

I claim as my invention:—

1. A car-wheel or other circular article formed during rotation and having a hub and web or central portion and a rim portion formed integral with said central portion, one side of said central portion and the adjacent inner peripheral face of the rim being die-formed and the remaining surfaces of said car-wheel or other article being rolled to form, the central portion of the car-wheel or other article being formed or composed of metal having a given strength and the rim portion being formed or composed of metal of increased strength.

2. A car-wheel or other circular article formed during rotation and having a hub and web or central portion and a rim portion formed integral with said central portion, one side of said central portion and the adjacent inner peripheral face of the rim being die-formed and the remaining surfaces of said car-wheel or other article being rolled to form, said car-wheel or other article having been dished during or after the forming of the rim portion, the central portion of the car-wheel or other article being formed or composed of metal having a given strength or density and the rim portion being formed or composed of metal of increased strength or increased density.

3. A car-wheel or other article partly die and roll-forged and partly roll-forged with the peripheral face and the opposite sides of the rim thereof roll-forged.

4. A car-wheel or other article partly die and roll-forged and partly roll-forged with the peripheral face and the opposite sides of the rim thereof roll-forged and having been dished during or after the forging thereof.

5. A car-wheel or other circular object formed partly by die and roll-forging and partly by roll-forging and having a hub and web or central portion and a rim portion formed integral with said central portion and whose central portion is formed or composed of metal having a given strength and whose rim portion is formed or composed of metal of increased strength.

6. A car-wheel or other circular object formed partly by die and roll-forging and partly by roll-forging and having a hub and web or central portion and a rim portion formed integral with said central portion and having been dished during or after the forging of the rim portion and whose central portion is formed or composed of metal having a given strength or density and whose rim portion is formed or composed of metal of increased strength or increased density.

7. A forged car-wheel or other circular article formed partly by die and roll-forging and partly by roll-forging and having a hub and web or central portion and a flanged rim formed integral with said central portion and whose central portion is formed or composed of metal having a given strength and whose flanged rim is formed of metal of uniform or practically uniform density and of increased strength.

8. A forged car-wheel or other circular article formed partly by die and roll-forging and partly by roll-forging and having a hub and web or central portion and a flanged rim formed integral with said central portion and having been dished during or after the forging of the rim portion and whose central portion is formed or composed of metal having a given strength or density and whose flanged rim is formed of metal of uniform or practically uniform density and of increased strength or increased density.

9. A car-wheel or other circular article partly die and roll-forged and partly roll-forged and having a hub and web or central portion and a rim or marginal portion formed integral with said central portion, and whose central portion is formed or composed of metal of a given strength, whose rim or marginal portion, except its tread or peripheral portion, is formed or composed of metal of increased strength and whose tread or peripheral portion is formed or composed of metal of still greater strength.

10. A car-wheel or other circular article partly die and roll-forged and partly roll-forged and having a hub and web or central portion and a rim or marginal portion formed integral with said central portion and having been dished during or after the forging of the rim or marginal portion and whose central portion is formed or composed of metal of a given strength or density, whose rim or marginal portion, except its tread or peripheral portion, is formed or composed of metal of increased strength or increased density and whose tread or peripheral portion is formed or composed of metal of still greater strength or density.

11. A car-wheel or other circular article having its central portion and one of the inner peripheral faces of its rim formed by die and roll-forging and having the remaining faces of its rim or marginal portion formed by roll-forging and having been dished during or after the forging of its rim.

12. A car-wheel or other circular article partly die and roll-forged and partly roll-forged with the peripheral face thereof roll-forged and having been dished during or after the forging thereof.

13. A car-wheel or other circular article partly roll-formed including its peripheral face, and partly die-formed, and having been dished during or after the formation thereof while rotating.

14. A car-wheel or other circular article partly die and roll-forged and partly roll-forged and having a central portion and a rim portion formed integral with said central portion and wherein the carbon content is the same in the central portion as in the rim portion but wherein the metal comprising said rim portion is stronger than the metal in said central portion.

15. A car-wheel or other circular article partly die and roll-forged and partly roll-forged and having a central portion and a rim portion formed integral with said central portion and having been dished during or after the forging of the rim portion and wherein the carbon content is the same in the central portion as in the rim portion but wherein the metal comprising said rim portion is stronger than the metal in said central portion.

16. A car-wheel or other circular article having a central portion formed by die and roll-forging and composed of metal of given density, and a rim portion having its inner peripheral face or one of its inner peripheral faces die and roll-forged and being otherwise formed by roll-forging, said rim portion being formed integral with said central portion and being composed of metal of increased density.

17. A car-wheel or other circular article having a central portion formed by die and roll-forging and composed of metal of given density, and a rim portion having its inner peripheral face or one of its inner peripheral faces die and roll-forged and being otherwise formed by roll-forging, said car-wheel or other article having been dished during or after the forging of the rim portion and said rim portion being formed integral with said central portion and being composed of metal of increased density.

18. An integral car-wheel or other circular article having a central portion formed by die and roll-forging and a rim portion which with the exception of its inner peripheral face or one of its inner peripheral faces is formed solely by roll-forging, the whole having been so formed during rotation and having been dished during or after the formation of said rim and while rotating.

19. As an article of manufacture, a dished car-wheel or other circular dished article formed integral and having a die and roll-forged hub and web or central portion and having a rim or marginal portion which with the exception of its inner peripheral face or one of its inner peripheral faces is formed solely by roll-forging, said hub and web or central portion having been die and roll-forged to undished form and then dished during or after the roll-forging of said rim or marginal portion.

20. As an article of manufacture, an integral car-wheel formed partly by die and roll-forging and partly by roll-forging and by dishing and having a body portion and a rim portion, the metal thereof being of varied density or strength in circular regions with the tread or peripheral portion of greatest density or strength.

21. An integral car-wheel or similar article having a die and roll-forged and dished web portion, a die and roll-forged hub portion, and a roll-forged rim portion having its inner peripheral face or one of its inner peripheral faces die and roll-forged.

22. A car-wheel or similar article having a die and roll-forged and dished central portion dished during rotation and also having a rim all of whose surfaces with the exception of its inner peripheral face or one of its inner peripheral faces have been rolled to form.

23. A car-wheel or other circular article formed integral and having a die and roll-forged and dished central portion dished during rotation and also having a rim or marginal portion whose peripheral face is adapted for wearing action and the surfaces of whose major portion including the peripheral face thereof have been rolled to form.

24. An integral car-wheel or other circular integral article partly roll-forged and partly die and roll-forged and having been dished during rotation.

25. A partly die and roll-forged and dished and partly roll-forged car-wheel having a body portion and a rim or marginal portion and having the metal thereof worked to different density in adjoining circular regions, the metal being worked or forged to increased density toward the periphery of the wheel or other article.

26. A dished car-wheel or other dished circular article formed integral and having a dished body portion and a rim or marginal portion, said body and rim portions being die and roll-forged, said body portion having been first die and roll-forged to undished form and then dished during or after the forging of said rim or marginal portion.

27. An integral car-wheel or other circular article partly die and roll-forged and partly roll-forged and having a hub and web or body portion and a rim or marginal portion, said web being die and roll-forged to undished form and said hub being die and roll-forged and extending a greater distance from one side of the web than the other, the peripheral face of said wheel or other circular article being rolled to form.

28. An integral car-wheel or other circular article partly die and roll-forged and dished and partly roll-forged and having a hub and web or body portion and a rim or marginal portion, said web having been die and roll-forged to undished form and then dished, and said hub being die and roll-forged and extending a greater distance from one side of the web than the other, the peripheral face of said wheel or other article being rolled to form.

29. A car-wheel partly die and roll-forged and partly roll-forged from an ingot, bloom, blank or other work-piece and having its hub formed or punched or pierced forming a preliminary bore, or a part or parts thereof.

30. A rudimentarily formed car-wheel having a die and roll-forged body portion and a partly die and roll-forged and partly roll-forged rim whose outer periphery is rolled to conical or approximately conical form so as to permit of its being rolled or formed to finish with a tread having a flange.

31. A rudimentarily formed car-wheel having a roll and die-formed body portion and a partly die and roll-forged and partly roll-forged rim portion whose outer periphery is rolled with a concaved or conical portion and opposite cylindrical portions, one of said cylindrical portions being of greater diameter than the other.

32. A rudimentarily formed car-wheel or other circular article having a rim portion mainly roll-forged and a die and roll-forged web formed integral with said rim portion, the inner peripheral face or faces of said rim portion being formed sufficiently conical or inclined outwardly toward the periphery of the wheel to have condensed or compressed the metal therein to uniform or to practically uniform density, substantially as described.

33. A rudimentarily formed car-wheel having a partly die and roll-forged and partly roll-forged rim portion and a die and roll-forged central or hub and web portion formed integral with said rim portion, the inner peripheral face or faces of said rim portion being formed or forged sufficiently conical or inclined outwardly toward the periphery of the wheel to have caused the metal to flow in the proper direction and to have condensed or compressed the metal therein to uniform or to practically uniform density, substantially as described.

34. A car-wheel having a rim portion and a central or hub and web portion formed integral with said rim portion, one side of said central or hub and web portion and the adjoining inner peripheral face of said rim portion being die-formed and the remaining surfaces of the car-wheel including the outer peripheral face thereof and the opposite inner peripheral face of said rim portion being rolled to form, the first-mentioned inner peripheral face of said rim portion being die-formed sufficiently conical or inclined outwardly toward the periphery of the wheel and the other being similarly rolled to have caused the metal to flow in the proper direction and to have condensed or compressed the metal therein to uniform or to practically uniform density, substantially as described.

35. A rudimentarily formed car-wheel or similar article formed integral and having a die and roll-forged central or hub and web portion and a marginal or rim portion mainly roll-forged, the outer periphery of said marginal or rim portion being rolled or formed with two cylindrical portions and a concaved or conical portion between said cylindrical portions, one of said cylindrical portions being of greater diameter than the other and the inner peripheral face or faces of said marginal or rim portion being formed or forged conical or inclined outwardly toward the periphery of the wheel or similar article, substantially as and for the purpose set forth.

36. A rudimentarily formed car-wheel or similar article formed integral and having a central or hub and web portion and a marginal or rim portion, one side of said central or hub and web portion and the adjoining inner peripheral face of said rim or marginal portion being die-formed and the remaining surfaces of the car-wheel or similar article including the opposite inner peripheral face of said rim portion being rolled to form, the outer periphery of said rim or marginal portion being rolled or formed with two cylindrical portions and a concaved or conical portion between said cylindrical portions, one of said cylindrical portions being of greater diameter than the other, the first-mentioned inner peripheral face of said rim or marginal portion being die-formed sufficiently conical or inclined outwardly toward the periphery of the wheel or similar article and the other being similarly rolled, substantially as and for the purpose described.

37. A car-wheel having its hub formed at opposite ends with circular extensions of smaller diameter than the adjacent portions of the hub, one of said extensions being rolled to form and the other being die-formed.

38. A car-wheel having a die and roll-forged hub gradually diminished in diameter from a medial plane and having outwardly facing shoulders near each end and short annular reduced end portions whereby the ends to be faced present comparatively small surfaces.

39. A car-wheel having a die and roll-forged hub provided at one end with an outwardly facing shoulder and an end extension of smaller diameter than said shoulder.

40. A car-wheel having a portion of one side thereof die-formed and the remaining surfaces thereof including the peripheral face and the opposite sides of its rim rolled to form.

41. A car-wheel or similar circular body formed from an ingot, bloom, blank or other work-piece and having a rim, and a hub and web or central portion formed integral with said rim, the opposite edges and the outer peripheral face of said rim being rolled to any desired form or shape, the inner peripheral face of said rim at one side of said car-wheel or similar body being rolled sufficiently conical or inclined outwardly toward the outer periphery of said rim and the opposite inner peripheral face of said rim being similarly formed to have condensed or compressed the metal in said rim to uniform or to practically uniform density, substantially as described.

42. A car-wheel or similar circular body formed from an ingot, bloom, blank or other work-piece and having a rim, and a hub and web or central portion formed integral with said rim, the exterior surfaces of said rim being rolled to any desired form or shape and both the inner peripheral faces of said rim being formed sufficiently conical or inclined outwardly toward the outer periphery of said rim to have condensed or compressed the metal in said rim to uniform or to practically uniform density, substantially as described, one of said inner peripheral faces being die-formed and the other being rolled to form.

43. A car-wheel or similar body formed from an ingot, bloom, blank or other work-piece and having a mainly roll-forged rim, and a die and roll-forged hub and web or central portion formed integral with said rim and being dished during or after the forming of said rim, the outer peripheral face of said rim being rolled or formed to any desired form or shape and the opposite inner peripheral faces of said rim being respectively rolled and die-formed sufficiently conical or inclined outwardly toward the outer periphery of said rim to have condensed or compressed the metal in said rim to uniform or to practically uniform density, substantially as described.

44. A car-wheel or similar circular article formed from an ingot, bloom, blank or other work-piece and having a rim, and a hub and web or central portion formed integral with said rim, the outer peripheral face of said rim being rolled or formed to any desired form or shape and the opposite inner peripheral faces of said rim having been respectively rolled and die-formed sufficiently conical or inclined outwardly toward the outer periphery of said rim to have condensed or compressed the metal in said rim to uniform or to practically uniform density, substantially as described, the inner peripheral face so rolled having been then rolled to desired finished form.

45. A car-wheel or similar circular article rolled or formed from an ingot, bloom, blank or other work-piece and having a rim, and a hub and web or central portion formed integral with said rim, the outer peripheral face of said rim being rolled or formed to any desired form or shape and the inner peripheral face of said rim at one side of the car-wheel or similar article being die-formed sufficiently conical or inclined outwardly toward the outer periphery of said rim to have condensed or compressed the metal in said rim to uniform or to practically uniform density during the rolling or forming of said rim, substantially as described.

46. A car-wheel or similar circular article formed from an ingot, bloom, blank or other work-piece and having a rim, and a hub and web or central portion formed integral with said rim, the inner peripheral face of said rim at one side of the car-wheel or other similar article being die-formed conical or inclined outwardly toward the outer periphery of said rim and the remaining surfaces of said rim having been formed to desired form with rolls arranged to surround the rim in a plane passing laterally through the same and working in conjunction with each other and part thereof in conjunction with said die.

47. A car-wheel or similar article having a partly die and roll-forged and partly roll-forged rim and being otherwise die and roll-forged, said car-wheel or similar article being formed from an ingot, bloom, blank or other work-piece, one of the inner peripheral faces of said rim being die-formed to desired shape and the other inner peripheral face and the outer peripheral face of said rim having been first rolled or formed to rudimentary forms or shapes and then to desired finished forms, substantially as described.

48. A car-wheel or similar article having the outer faces and one of the inner peripheral faces of its rim rolled to desired forms, said rim being otherwise die and roll-formed.

49. An integral car-wheel or other circular article having a die and roll-forged central portion, and a rim having its outer peripheral face and its opposite sides roll-forged.

50. An integral car-wheel or other circular article having a rim and a central portion surrounded by said rim, said central portion being die and roll-forged and dished and the remaining portion or portions of said wheel or other article being rolled to form.

51. An integral car-wheel or similar article partly die and roll-forged and partly roll-forged including its peripheral face roll-forged, the peripheral face of said wheel or similar article evidencing the rolling thereof.

52. An integral car-wheel or similar article partly die and roll-forged and partly roll-forged including its peripheral face rolled to form and having been forged to undished form and then dished, the peripheral face of said wheel or similar article evidencing the rolling thereof.

53. An integral car-wheel or similar article partly die and roll-forged and partly roll-forged with the outer peripheral face and opposite sides of its rim roll-forged, the outer peripheral face and opposite sides of the rim of said wheel or similar article evidencing the rolling thereof.

54. An integral car-wheel or similar article partly die and roll-forged and partly roll-forged with the outer peripheral face and opposite sides of its rim roll-forged, and having been forged to undished form and then dished, the outer peripheral face and opposite sides of the rim of said wheel or similar article evidencing the rolling thereof.

55. An integral car-wheel or similar article partly die and roll-forged and partly roll-forged with the outer peripheral face and one of the opposite sides of its rim roll-forged, the outer peripheral face and one of the opposite sides of the rim of said wheel or similar article evidencing the rolling thereof.

56. An integral car-wheel or similar article partly die and roll-forged and partly roll-forged with the outer peripheral face and one of the opposite sides of its rim roll-forged, and having been forged to undished form and then dished, the outer peripheral face and one of the opposite sides of the rim of said wheel or similar article evidencing the rolling thereof.

57. A wheel or other circular article formed integral and whose outer peripheral face has been first rolled to desired rudimentary form and then rolled to desired finished form.

58. A car wheel or other circular article formed integral and whose outer peripheral face has been first rolled to desired rudimentary form and then rolled to desired finished form, said car wheel or other article having been dished during rotation before or during or after the rolling of its said outer peripheral face.

59. A wheel or other circular article having a rim of marginal portion which has been first rolled or formed to desired rudimentary form and then rolled or formed to desired finished form.

60. A car wheel or other circular article having a rim or marginal portion which has been first rolled or formed to desired rudimentary form and then rolled or formed to desired finished form, said car wheel or other article having been dished during rotation before or during or after the formation of its said rim or marginal portion.

61. A car wheel or other similar article which has been first formed to undished form and then dished during rotation.

62. A car wheel or other circular article which has been dished from undished form into dished form during rotation.

63. A wheel or other circular article which has been formed at its entire opposite sides by rotatable or rotated pressure instrumentalities and at its outer peripheral face by a peripheral face roll while the operating parts of said instrumentalities and said roll have together completely surrounded said opposite sides and outer peripheral face in a plane passing radially and transversely through the work-piece or wheel or other article, thereby giving to the metal of said wheel or other article so formed the desired peculiar qualities specified.

64. A wheel or other circular article which has been formed at its entire opposite sides by rotatable or rotated pressure instrumentalities and at its entire outer peripheral face by a peripheral face roll while the operating parts of said instrumentalities and said roll have together completely surrounded said opposite sides and outer peripheral face in a plane passing radially and transversely through the work-piece or wheel or other article, said outer peripheral face having been so formed during said forming operation to desired rudimentary form and having been then rolled to desired finished form, thereby giving to the metal of all parts of said wheel or other article so formed the desired different qualities specified.

65. A car wheel or similar circular article which has been formed at its entire opposite sides by rotatable or rotated pressure instrumentalities and at its entire outer peripheral face by a peripheral face-roll while the operating parts of said instrumentalities and said roll have together completely surrounded said opposite sides and outer peripheral face in a plane passing radially and transversely through the work-piece or car wheel or similar article, thereby giving to the metal of said car wheel or similar article so formed the desired peculiar qualities specified, said car wheel or similar article having been so formed to undished form and having been dished during or after the operation of forming the same.

66. A car wheel or similar circular article which has been formed at its entire opposite sides by rotatable or rotated pressure instrumentalities and at its entire outer peripheral face by a peripheral face-roll while the operating parts of said instrumentalities and said roll have together completely surrounded said opposite sides and outer peripheral face in a plane passing radially and transversely through the work-piece or car wheel or similar article, said outer peripheral face having been so formed during said forming operation to desired rudimentary form and having been then rolled to desired finished form, thereby giving to the metal of all parts of said car wheel or similar article so formed the desired peculiar qualities specified, said car wheel or similar article having been so formed to undished form and having been dished during or after the operation of forming the same.

67. A wheel or other circular article which has been formed during rotation and having a hub and web or central portion and a rim or marginal portion and which hub and web or central portion and rim or marginal portion have been completely formed by rotatable or rotated side-instrumentalities and a peripheral face-roll while the operating parts of said instrumentalities during the formation of said wheel or other article have extended from the axis or from near the axis of the work-piece outwardly beyond the periphery of the work-piece or wheel or other article and have operated against said central and rim portions and while said face roll has been operating between and in contact with said instrumentalities and against the peripheral face of the work-piece and while the pressure operating parts of said instrumentalities and the pressure operating part or parts of said face roll have together completely or entirely surrounded the work-piece or wheel or other article in a plane passing radially and transversely through the work-piece or wheel or other article, thereby giving to the metal of said wheel or other article so formed the desired peculiar qualities specified.

68. A wheel or other circular article which has been formed during rotation and having a hub and web or central portion and a rim or marginal portion and which hub and web or central portion and rim or marginal portion have been completely formed by rotatable or rotated side instrumentalities and a peripheral face-roll while the operating parts of said instrumentalities during the formation of said wheel or other article have extended from the axis or from near the axis of the work-piece outwardly beyond the periphery of the work-piece or wheel or other article and have operated against said central and rim portions and while said face roll has been operating between and in contact with said instrumentalities and against the peripheral face of the work-piece and while the pressure operating parts of said instrumentalities and the pressure operating part or parts of said face roll have together completely or entirely surrounded the work-piece or wheel or other article in a plane passing radially and transversely through the work-piece or wheel or other article, said peripheral face having been so formed during said forming operation to desired rudimentary form and having been then rolled to desired finished form, thereby giving to the metal of the different portions of said wheel or other article so formed the desired different peculiar qualities specified.

69. A car wheel or other circular article which has been formed during rotation and having a hub and web or central portion and a rim or marginal portion and which hub and web or central portion and rim or marginal portion have been completely formed by rotatable or rotated side instrumentalities and a peripheral face-roll while the operating parts of said instrumentalities during the formation of said car wheel or other article have extended from the axis or from near the axis of the work-piece outwardly beyond the periphery of the work-piece or car wheel or other article and have operated against said central and rim portions and while said face roll has been operating between and in contact with said instrumentalities and against the peripheral face of the work-piece and while the pressure operating parts of said instrumentalities and the pressure operating part or parts of said face roll have together completely or entirely surrounded the work-piece or car wheel or other article in a plane passing radially and transversely through the work-piece or car wheel or other article, thereby giving to the metal of said car wheel or other article so formed the desired peculiar qualities specified, said car wheel or other article having been so formed to undished form and having been dished during or after the operation of forming the same.

70. A car wheel or other circular article which has been formed during rotation and having a hub and web or central portion and a rim or marginal portion and which hub and web or central portion and rim or marginal portion have been completely formed by rotatable or rotated side instrumentalities and a peripheral face-roll while the operating parts of said instrumentalities during the formation of said car wheel or other article have extended from the axis or from near the axis of the work-piece outwardly beyond the periphery of the work-piece or car wheel or other article and have operated against said central and rim portions and while said face roll has been operating between and in contact with said instrumentalities and against the peripheral face of the work-piece and while the pressure operating parts of said instrumentalities and the pressure operating part or parts of said face roll have together completely or entirely surrounded the work-piece or car wheel or other article in a plane passing radially and transversely through the work-piece or car wheel or other article, said peripheral face having been so formed during said forming operation to desired rudimentary form and having been then rolled to desired finished form, thereby giving to the metal of all parts of said car wheel or other article so formed the desired peculiar qualities specified, said car wheel or other article having been so formed to undished form and having been dished during or after the operation of forming the same.

71. An undished car wheel which has had its rim or marginal portion formed at its outer peripheral face and at its opposite sides including at least its inner peripheral face or one of its inner peripheral faces by rolling pressures which have together completely surrounded said outer peripheral face and said opposite sides including at least its said inner peripheral face or one of its said inner peripheral faces in a plane passing radially and transversely through said rim or marginal portion, thereby giving to the metal of said rim or marginal portion so formed the desired qualities specified.

72. An undished car wheel which has had its rim or marginal portion formed at its outer peripheral face and at its opposite sides including at least its inner peripheral face or one of its inner peripheral faces by rolling pressures which have together completely surrounded said outer peripheral face and said opposite sides including at least its said inner peripheral face or one of its said inner peripheral faces in a plane passing radially and transversely through said rim or marginal portion, said rim or marginal portion having been so formed during said forming operation to desired rudimentary form and having been then rolled to desired finished form, thereby giving to the metal of said rim or marginal portion so formed the desired peculiar qualities specified.

73. A car wheel or similar circular body which has had its rim or marginal portion formed at its outer peripheral face and at its opposite sides including at least its inner peripheral face or one of its inner peripheral faces by rolling pressures which have together completely surrounded said outer peripheral face and said opposite sides including at least its said inner peripheral face or one of its said inner peripheral faces in a plane passing radially and transversely through said rim or marginal portion, thereby giving to the metal of said rim or marginal portion so formed the desired peculiar qualities specified, said car wheel or similar body having been dished from undished form into dished form during or after the operation of forming said rim or marginal portion.

74. A car wheel or similar body which has had its rim or marginal portion formed at its outer peripheral face and at its opposite sides including at least its inner peripheral face or one of its inner peripheral faces by rolling pressures which have together completely surrounded said outer peripheral face and said opposite sides including at least its said inner peripheral face or one of its said inner peripheral faces in a plane passing radially and transversely through said rim or marginal portion, said rim or marginal portion having been so formed during said forming operation to desired rudimentary form and having been then rolled to desired finished form, thereby giving to the metal of said rim or marginal portion so formed the desired different peculiar qualities specified, said car wheel or similar body having been dished from undished form into dished form during or after the operation of forming said rim or marginal portion.

75. A wheel or other circular body having a rim or marginal portion and having been completely formed during rotation from a suitable work-piece by surrounding pressures applied thereto in a plane passing radially and laterally through the work-piece or wheel or other body including rolling pressures applied in said plane to one of the opposite sides of said rim or marginal portion and to the outer peripheral face thereof, thereby giving to the metal of all parts of said wheel or other body so formed the desired peculiar qualities specified.

76. A wheel or other circular body having a rim or marginal portion and having been completely formed during rotation from a suitable work-piece by surrounding pressures applied thereto in a plane passing radially and laterally through the work-piece or wheel or other body including rolling pressures applied in said plane to one of the opposite sides of said rim or marginal portion and to the outer peripheral face thereof, said rim or marginal portion having been so formed during said forming operation to desired rudimentary form and having been then rolled to desired finished form, thereby giving to the metal of said wheel or other body so formed the desired peculiar qualities specified.

77. A car wheel or other circular body having a central portion and a rim or marginal portion and having been completely formed during rotation from an ingot, bloom, blank, or other work-piece by surrounding pressures applied thereto in a plane passing radially and laterally through the work-piece or car wheel or other body including rolling pressures applied in said plane to one of the opposite sides of said rim or marginal portion and to the outer peripheral face thereof, thereby giving to the metal of the desired different portions of said car wheel or other body so formed the desired peculiar qualities specified, said car wheel or other body having been so formed to undished form and having been dished during or after the operation of forming the same.

78. A car wheel or other circular body having a central portion and a rim or marginal portion and having been completely formed during rotation from an ingot, bloom, blank, or other work-piece by surrounding pressures applied thereto in a plane passing radially and laterally through the work-piece or car wheel or other body including rolling pressures applied in said plane to one of the opposite sides of said rim or marginal portion and to the outer peripheral face thereof, said rim or marginal portion having been so formed during said forming operation to desired rudimentary form and having been then rolled to desired finished form, thereby giving to the metal of the desired different portions of said car wheel or other body so formed the desired peculiar qualities specified, said car wheel or other body having been so formed to undished form and having been dished during or after the operation of forming the same.

In testimony whereof, I have hereunto set my hand.

LOUIS F. DIETER.

Witnesses:
 JOHN A. L. BECKER,
 MAUDE E. WESNER.